United States Patent
Freimuth et al.

(10) Patent No.: US 7,529,860 B2
(45) Date of Patent: May 5, 2009

(54) SYSTEM AND METHOD FOR CONFIGURING AN ENDPOINT BASED ON SPECIFIED VALID COMBINATIONS OF FUNCTIONS

(75) Inventors: Douglas M. Freimuth, New York, NY (US); Renato J. Recio, Austin, TX (US); Claudia A. Salzberg, Austin, TX (US); Steven M. Thurber, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 11/612,555

(22) Filed: Dec. 19, 2006

(65) Prior Publication Data

US 2008/0147898 A1    Jun. 19, 2008

(51) Int. Cl.
G06F 3/00    (2006.01)
(52) U.S. Cl. ..................... 710/8; 710/3; 710/9
(58) Field of Classification Search ............ 710/3, 710/8, 9
See application file for complete search history.

(56) References Cited

U.S. PATENT DOCUMENTS

| | | | |
|---|---|---|---|
| 6,125,114 A * | 9/2000 | Blanc et al. | 370/389 |
| 6,684,281 B1 | 1/2004 | Sugahara et al. | |
| 7,308,523 B1 * | 12/2007 | Ngai | 710/313 |
| 2002/0194407 A1 | 12/2002 | Kim | |
| 2004/0019729 A1 * | 1/2004 | Kelley et al. | 710/306 |
| 2006/0101186 A1 * | 5/2006 | Lee | 710/313 |
| 2006/0161419 A1 * | 7/2006 | Herrell et al. | 703/26 |
| 2006/0242354 A1 | 10/2006 | Johnsen et al. | |
| 2006/0277348 A1 * | 12/2006 | Wooten | 710/315 |
| 2008/0005415 A1 * | 1/2008 | Lopez et al. | 710/62 |
| 2008/0005706 A1 * | 1/2008 | Sharma et al. | 716/4 |
| 2008/0034147 A1 * | 2/2008 | Stubbs et al. | 710/315 |

OTHER PUBLICATIONS

U.S. Appl. No. 11/612,522, filed Dec. 19, 2006, Freimuth et al.
U.S. Appl. No. 11/612,526, filed Dec. 19, 2006, Freimuth et al.
U.S. Appl. No. 11/612,530, filed Dec. 19, 2006, Freimuth et al.

(Continued)

*Primary Examiner*—Niketa I Patel
*Assistant Examiner*—Ernest Unelus
(74) *Attorney, Agent, or Firm*—Stephen J. Walder, Jr.; Libby Z. Handelsman

(57) ABSTRACT

A system and method for registering combinations of physical and/or virtual functions for configuring an endpoint are provided. With the system and method, a mechanism informs a management component of a multifunction endpoint's functional combinations. The management component may then use this information to select the functional combinations that are to be made visible to each system image. The informing of the management component may be performed by writing values to various predefined fields in a configuration space for a physical or virtual function that provides information regarding the number of virtual functions supported, the combination of functions supported, a nominal combination of virtual functions to be used by the physical function, and a group identifier for identifying which functions are linked in a combination grouping.

12 Claims, 21 Drawing Sheets

OTHER PUBLICATIONS

U.S. Appl. No. 11/612,535, filed Dec. 19, 2006, Freimuth et al.
U.S. Appl. No. 11/612,538, filed Dec. 19, 2006, Freimuth et al.
U.S. Appl. No. 11/612,543, filed Dec. 19, 2006, Freimuth et al.
U.S. Appl. No. 11/612,547, filed Dec. 19, 2006, Freimuth et al.
U.S. Appl. No. 11/612,562, filed Dec. 19, 2006, Freimuth et al.

* cited by examiner

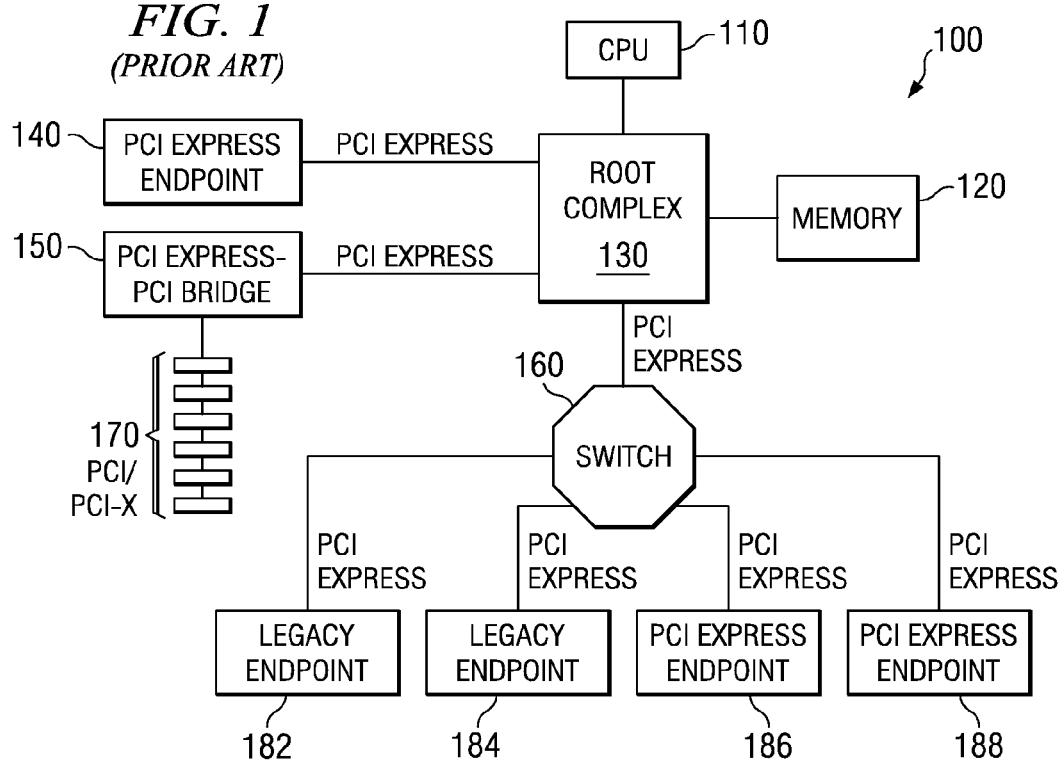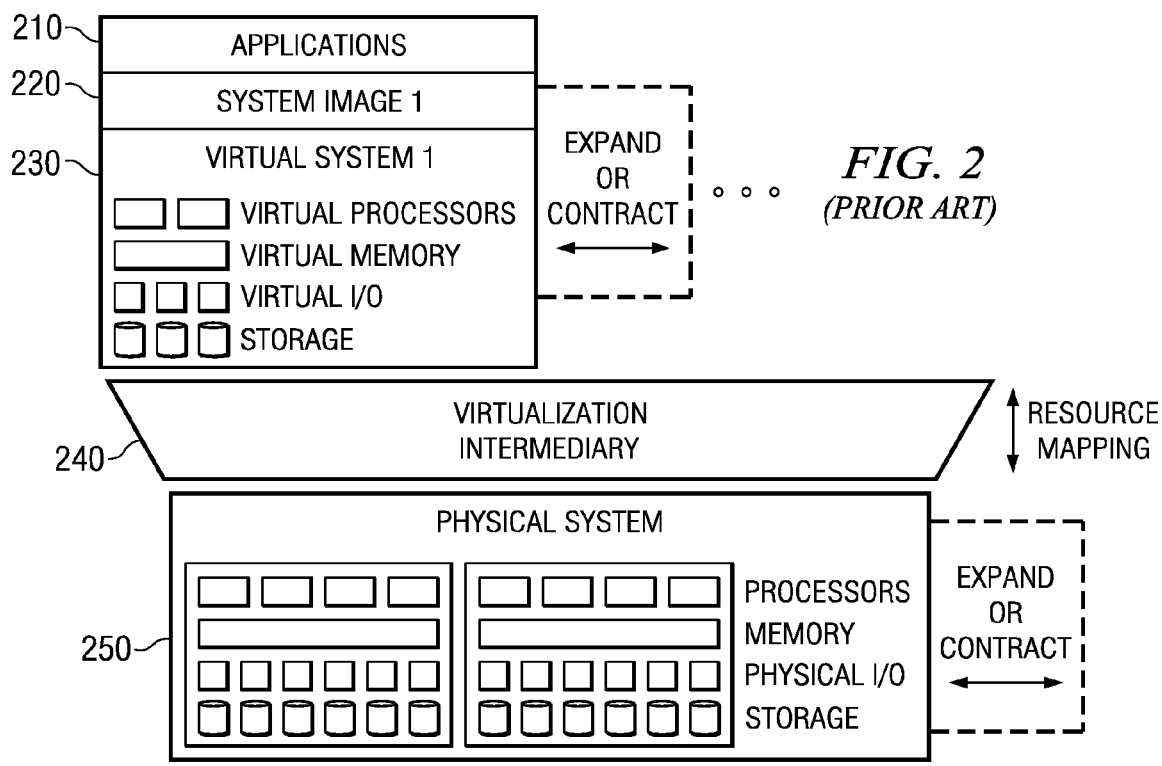

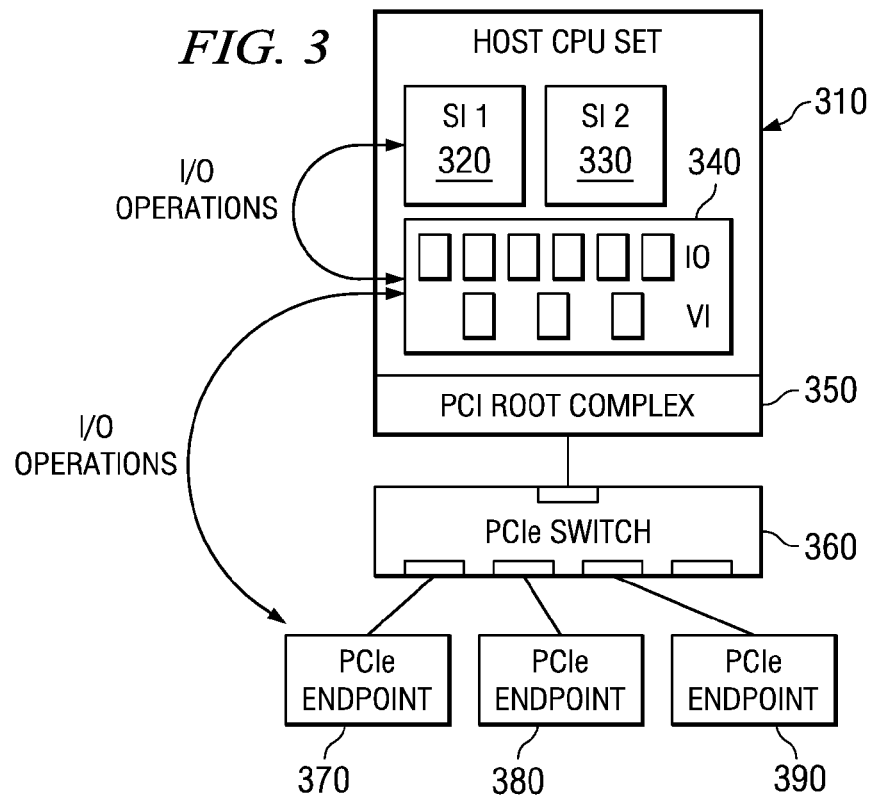
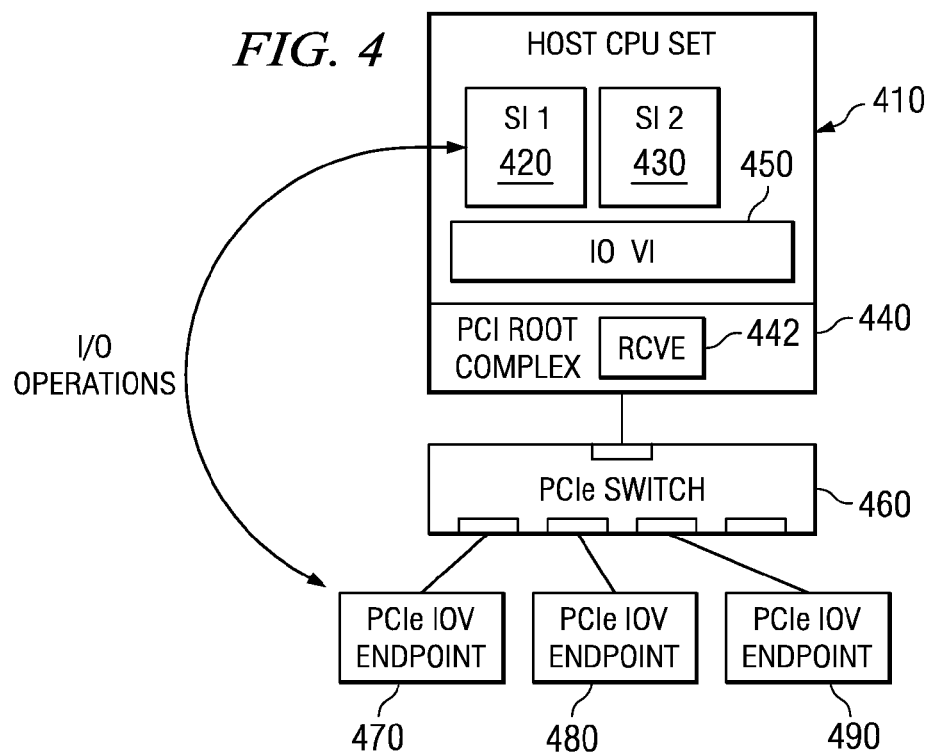

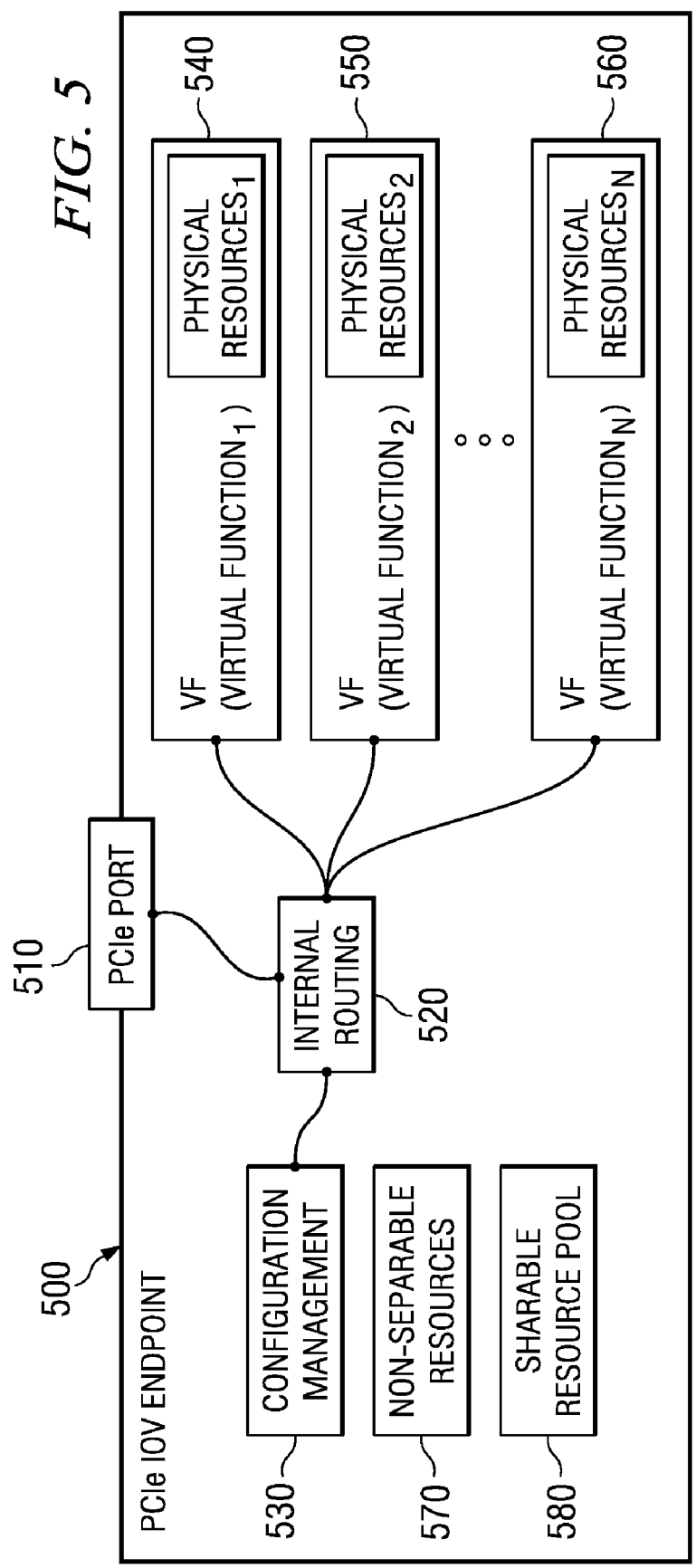

| SR-IOV PCIe EXTENDED CONFIGURATION SPACE ||
|---|---|
| SR-IOV CAPABILITIES | NEXT CAP PTR |
| RID SPACE ALLOCATION REGISTER(S) (TBD BY RID SUBTEAM) ||
| MAX VFS ||
| NUM VFS FP ||
| NOMINAL COMBO NUMBER (RW) ← 2101 ||
| COMBO INSTANCE NUMBER (RW) ← 2102 ||
| SUPPORTED COMBO BITMAP (RO) ← 2103 ||
| STRIDE$_1$ ||
| ⋮ ||
| STRIDE$_N$ ||

| NOMINAL COMO NUMBER (NCN) | $F_N$ | $F_{N-1}$ | ... | $F_1$ | $F_0$ | SUPPORTED COMBO BITMAP (SCB) |
|---|---|---|---|---|---|---|
| 0 | 0 | 0 | ... | 0 | 0 | 0 |
| 1 | 0 | 0 | ... | 0 | 1 | 0/1 |
| 2 | 0 | 0 | ... | 1 | 1 | 0/1 |
| 3 | 0 | 0 | ... | 0 | 0 | 0/1 |
| ⋮ | ⋮ | ⋮ | ⋮ | ⋮ | ⋮ | ⋮ |
| X-2 | 1 | 1 | ... | 0 | 0 | 0/1 |
| X-1 | 1 | 1 | ... | 0 | 1 | 0/1 |
| X | 1 | 1 | ... | 1 | 1 | 0/1 |

Column headers: 2201, 2202, 2203, 2204, 2205, 2206
Rows: 2207, 2208, 2209, 2210, 2211, 2212, 2213

SYSTEM AND METHOD FOR CONFIGURING AN ENDPOINT BASED ON SPECIFIED VALID COMBINATIONS OF FUNCTIONS

BACKGROUND

1. Technical Field

The present application relates generally to an improved data processing system and method. More specifically, the present application is directed to mechanisms for configuring an endpoint based on specified valid combinations of functions.

2. Description of Related Art

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a PCI Express (PCIe) fabric topology in accordance with the PCIe specification. As shown in FIG. 1, the PCIe fabric topology 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 170 and 182-188. For more information regarding PCI and PCIe, reference is made to the PCI and PCIe specifications available from the peripheral component interconnect special interest group (PCI-SiG) website at www.pcisig.com.

Today, PCI and PCIe I/O adapters, buses, and the like, are integrated into almost every computing device's motherboard, including blades of a blade server. A blade server is essentially a housing for a number of individual minimally-packaged computer motherboard "blades", each including one or more processors, computer memory, computer storage, and computer network connections, but sharing the common power supply and air-cooling resources of the chassis. Blade servers are ideal for specific uses, such as web hosting and cluster computing.

As mentioned above, the PCI and PCIe I/O adapters are typically integrated into the blades themselves. As a result, the I/O adapters cannot be shared across blades in the same blade server. Moreover, the integration of the I/O adapters limits the scalability of the link rates. That is, the link rates may not scale with processor performance over time. As of yet, no mechanism has been devised to allow PCI and PCIe I/O adapters to be shared by multiple system images across multiple blades. Moreover, no mechanism has been devised to allow the PCI and PCIe I/O adapters to be provided in a non-integrated manner for use by a plurality of blades in a blade server.

SUMMARY

In order to address the limitations with current PCI and PCIe I/O adapter integration, the illustrative embodiments provide a mechanism that allows a PCIe adapter to be natively shared by two or more system images (SIs). For example, a mechanism is provided for enabling an endpoint, e.g., a PCIe I/O adapter, to be simultaneously shared by multiple SIs within the same root complex or across multiple root complexes (RCs) that share, i.e. are coupled to, a common PCI switch fabric. The mechanism allows each root complex and its associated physical and/or virtual endpoints (VEPs) to have their own unique PCI memory address space.

In addition, missing from the base PCI specifications, but required for managing the complex configurations which result from the sharing of endpoints, is the necessity for determination of, and the management of, possible combinations of the PCI functions in the endpoint. Therefore, the illustrative embodiments herein provide a mechanism for one root complex of a first blade in a blade server to communicate with a second root complex of a second blade in the same or a different blade server. The illustrative embodiments support such communication by providing a mechanism to initialize a shared memory between the root complexes and endpoints in a multi-root blade cluster that is used to facilitate such communication.

In one illustrative embodiment, a multi-root PCIe configuration manager (MR-PCIM) initializes the shared memory between root complexes and endpoints by discovering the PCIe switch fabric, i.e. the PCIe hierarchies, by traversing all the links accessible through the interconnected switches of the PCIe switch fabric. As the links are traversed, the MR-PCIM compares information obtained for each of the root complexes and endpoints to determine which endpoints and root complexes reside on the same blade. A virtual PCIe tree data structure is then generated that ties the endpoints available on the PCIe switch fabric to each root complex. Endpoints that are part of the same PCI tree, i.e. associated with the same root complex, are associated in the virtual PCIe tree data structure.

The MR-PCIM may then give each endpoint a base and limit within the PCIe memory address space the endpoint belongs to. Similarly, the MR-PCIM may then give each root complex a base and limit within the PCIe memory address space the root complex belongs to. A memory translation and protection table data structure may be generated for mapping between PCIe memory address spaces of the various endpoints and root complexes.

For example, for a particular endpoint or root complex, that endpoint or root complex may be associated with a real memory address space of a first host. The same endpoint or root complex may be accessible by a second host via a PCIe aperture on the second host memory that is accessible as a direct memory access I/O through the first host's PCI bus memory addresses. The first host may use a memory translation and protection table data structure to map the PCIe memory addresses seen by the second host into the real memory addresses of the first host.

In yet another illustrative embodiment, having initialized the memory address spaces of the host systems such that endpoints may be accessible by root complexes across host systems, these memory address spaces may then be used to allow system images, and their corresponding applications, associated with these root complexes to communicate with the endpoints.

One way in which such communication is facilitated is via a queuing system that utilizes these initialized memory address spaces in the various host systems. Such a queuing system may comprise a work queue structure and a completion queue structure. Both the work queue structure and the completion queue structure may comprise a doorbell structure for identifying a number of queue elements (either work queue elements (WQEs) or completion queue elements (CQE) depending upon whether the queue structure is a work queue structure or a completion queue structure), a base address for the start of a queue, a limit address for an end of the queue, and an offset which indicates the next WQE or CQE to be processed in the queue. Both the work queue structure and the completion queue structure may be used to both send and receive data.

The queue structures and the doorbell structures may be provided in portions of the host system memories corresponding to the root complexes and endpoints with which communication is to be performed. Queue elements may be generated and added to the queue structures and the doorbell structure may be written to, in order to thereby inform the endpoint or root complex that queue elements are available for processing. PCIe DMA operations may be performed to retrieve the queue elements and the data corresponding to the queue elements. Moreover, PCIe DMA operations may be performed to return completion queue elements (CQES) to indicate the completion of processing of a queue element.

In accordance with one illustrative embodiment, a transaction oriented protocol may be established for using the shared memories of the illustrative embodiments to communicate between root complexes and endpoints of the same or different host systems. The transaction oriented protocol specifies a series of transactions to be performed by the various elements, e.g., root complex or endpoint, to push or pull data. Various combinations of push and pull transactions may be utilized without departing from the spirit and scope of the present invention. The various combinations are described in greater detail in the detailed description hereafter.

In addition, the mechanisms of the illustrative embodiments may further be used to support socket protocol based communication between root complexes and endpoints of the same or different host systems via the shared memories described above. With such socket-based communication, a work queue in the host systems may be used to listen for incoming socket initialization requests. That is, a first host system that wishes to establish a socket communication connection with a second host system may generate a socket initialization request WQE in its work queue and may inform the second host system that the socket initialization request WQE is available for processing.

The second host system may then accept or deny the request. If the second host system accepts the request, it returns the second half of the socket's parameters for use by the first host system in performing socket based communications between the first and second host systems. These parameters may specify portions of a queue structure that are to be associated with the socket and a doorbell structure used to inform the host systems when a queue element is available for processing via the socket. The actual socket communications may involve, for example, pull transactions and/or push transactions between the host systems.

The mechanisms of the illustrative embodiments allow system images within a given root complex to use one or more of an endpoint's physical and virtual functions. With the addition of such ability, the interaction of physical and virtual functions of the various endpoints may need to be considered when providing the system images with the ability to use such functions. For example, various combinations of functions may be required, permitted, or not permitted depending upon various criteria.

As an example, there are functions (physical and/or virtual) that may be required to work in conjunction with one another to achieve a desired operation. For example, cryptographic functions and Ethernet functions may be required to work together to provide encrypted traffic control. Moreover, there may also be combinations of functions which should not be supported because their additive functions do not generate increased functionality. Furthermore, there may be other limitations that prohibit all physical functions from having equal numbers of virtual functions.

The illustrative embodiments provide a mechanism by which multiple functions may be registered in combinations. The mechanism informs a management component of a multifunction endpoint's functional combinations. The management component may then use this information to select the functional combinations that are to be made visible to each system image.

In one illustrative embodiment, a method for configuring an endpoint for use with a host system is provided. The method may comprise extracting a configuration space combination bitmap from an endpoint configuration space, generating one or more functions associated with the endpoint, and associating at least one function with at least one other function in accordance with the configuration space combination bitmap to thereby generate a combination of functions. The method may further comprise utilizing the combination of functions to handle input/output requests provided to the endpoint.

The method may further comprise extracting a maximum number of virtual functions from the endpoint configuration space. Generation of one or more functions associated with the endpoint may comprise generating one or more virtual functions associated with one or more physical functions in the endpoint based on the maximum number of virtual functions. Associating at least one function with at least one other function may comprise associating at least one of the one or more virtual functions or the one or more physical functions with at least one of another virtual function or another physical function. Moreover, the method may comprise displaying a maximum number of virtual functions for the one or more physical functions based on the identified maximum number of virtual functions in the endpoint configuration space. The method may further comprise receiving user input specifying a configuration of the endpoint desired by a user based on the displayed maximum number of virtual functions. The method may also comprise determining a number of virtual functions to assign to each physical function in the one or more physical functions provided in the endpoint based on the user input. Moreover, the method may comprise setting a number of virtual functions field value in configuration spaces of the one or more physical functions based on the determined number of virtual functions to assign to each physical function.

Each bit in the configuration space combination bitmap may specify a different combination of at least one of physical functions or virtual functions. Setting individual ones of the bits in the configuration space combination bitmap may specify which combinations of at least one of physical functions or virtual functions are valid combinations of functions in the endpoint. Each bit in the configuration space combination bitmap may be associated with a unique combination number corresponding to a bit number of the bit in the configuration space combination bitmap. The combination number may be specified in configuration spaces of physical functions of the endpoint.

The configuration space combination bitmap may have a bit for each possible combination of at least one of physical functions or virtual functions provided in the endpoint. The method may further comprise generating a combination instance number for each valid combination of at least one of physical functions or virtual functions in the endpoint. The method may also comprise writing a corresponding combination instance number to configuration spaces associated with each physical function and virtual function in the endpoint. Associating at least one of the one or more virtual functions or the one or more physical functions with at least one of another virtual function or another physical function in accordance with the configuration space combination bitmap may comprise associating the physical functions or virtual functions based on combination instance numbers associated with the physical functions or virtual functions.

The method may comprise displaying fields corresponding to the configuration space combination bitmap. The method may also comprise receiving user input specifying a selection of one or more unique combination numbers to have implemented in the endpoint. Moreover, the method may comprise writing the one or more unique combination numbers to configuration spaces of at least one of physical functions or virtual functions of the endpoint.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise a host system and an endpoint coupled to the host system. The host system may perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram illustrating a PCIe fabric topology as is generally known in the art;

FIG. 2 is an exemplary diagram illustrating system virtualization as is generally known in the art;

FIG. 3 is an exemplary diagram illustrating a first approach to virtualizing I/O of a PCI root complex using a I/O virtualization intermediary;

FIG. 4 is an exemplary diagram illustrating a second approach to virtualizing I/O of a PCI root complex using natively shared PCI I/O adapters;

FIG. 5 is an exemplary diagram of a PCIe I/O virtualization enabled endpoint;

FIG. 21 is an exemplary table showing three new fields added to the PCIe configuration space in accordance with one illustrative embodiment;

FIG. 22 is an exemplary table representing an interpretation of a supported combo bitmap (SCB) that defines a supported combination of functions of an endpoint in accordance with one illustrative embodiment;

DETAILED DESCRIPTION OF THE PREFERRED EMBODIMENTS

Figure 6:
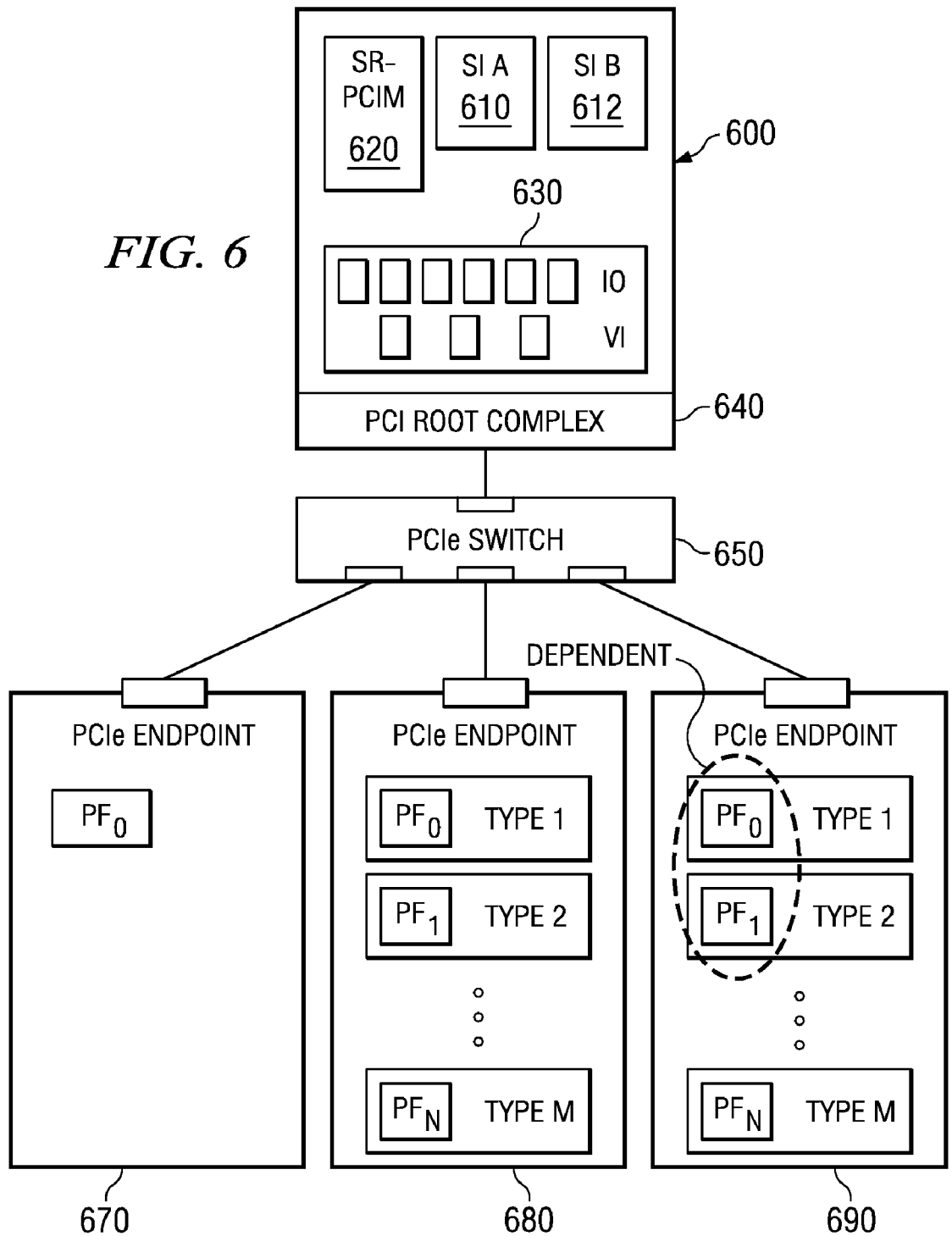
FIG. 6 is an exemplary diagram illustrating physical and virtual functions of single root endpoints without native virtualization.

The illustrative embodiments provide a mechanism that allows a PCIe adaptor, or "endpoint," to be natively shared by two or more system images (SIs) of the same or different root complexes, which may be on the same or different root nodes, e.g., blades of a blade server. Further, the illustrative embodiments provide a mechanism by which communication is facilitated between the system images and natively shared endpoints. In addition, the illustrative embodiments provide mechanisms for migrating virtual functions between virtual planes, root complexes, and system images to facilitate management of the PCIe fabric. Moreover, the illustrative embodiments provide a mechanism by which a root complex's single root PCI manager (SR-PCIM) is able to read, from an endpoint, the valid combinations of functions that the endpoint implementer allowed when designing the endpoint. The SR-PCIM may then set the combinations of functions that will be used in the current configuration in which the endpoint is being used.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization intermediary which creates virtual resources and maps them to the physical resources thereby providing isolation between virtual resources. The virtualization intermediary is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization intermediary 240. The virtualization intermediary 240 manages the allocation of resources to a SI and isolates resources assigned to a SI from access by other SIs. This allocation and isolation is often performed based on a resource mapping performed by the virtualization intermediary 240 and one or more resource mapping data structures maintained by the virtualization intermediary 240.

Such virtualization may be used to allow virtualization of I/O operations and I/O resources. That is, with regard to I/O virtualization (IOV), a single physical I/O unit may be shared by more than one SI using an I/O virtualization intermediary (IOVI), such as virtualization intermediary 240. The IOVI may be software, firmware, or the like, that is used to support IOV by intervening on, for example, one or more of configuration, I/O, and memory operations from a SI, and direct memory access (DMA), completion, and interrupt operations to a SI.

FIG. 3 is an exemplary diagram illustrating a first approach to virtualizing I/O of a PCI root complex using an I/O virtualization intermediary. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the I/O virtualization intermediary 340, PCIe root complex 350, and one or more PCIe switches 360, and/or other PCIe fabric elements.

With the approach illustrated in FIG. 3, the I/O virtualization intermediary 340 is involved in all I/O transactions and performs all I/O virtualization functions. For example, the I/O virtualization intermediary 340 multiplexes I/O requests from the various SIs' I/O queues onto a single queue in the PCIe endpoints 370-390. Thus, the I/O virtualization intermediary acts as a proxy between the SIs 320-330 and the physical PCIe endpoints 370-390.

Such involvement by the I/O virtualization intermediary 340 may introduce additional delay in the I/O operations which limits the number of I/O operations per unit of time, and thus limits I/O performance. In addition, the involvement of the I/O intermediary requires extra CPU cycles, thus reducing the CPU performance that is available to other system operations. Extra context switches and interrupt redirection mechanisms required by this approach can also affect overall system performance. Furthermore, an IOVI 340 is not feasible when an endpoint 370-390 is shared between multiple root complexes.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complex interrupt table data structures are accessible through the PCIe memory address space and are used to map interrupts to appropriate interrupt handlers associated with SIs, for example.

As with the arrangement shown in FIG. 3, an I/O virtualization interface 450 is provided in the virtualization structure of FIG. 4 as well. The I/O virtualization interface 450 is used with non-IOV enabled PCIe endpoints that may be coupled to the PCIe switch 460. That is, the I/O virtualization interface (IOVI) 450 is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the IOVI 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the IOVI 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490, as will be described in greater detail hereafter. The ability to perform direct I/O operations greatly increases the speed at which I/O operations may be performed, but requires that the PCIe endpoints 470-490 support I/O virtualization.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by an I/O virtualization intermediary, directly be a sink for I/O and memory operations from a system image, and be a source of Direct Memory Access (DMA), completion, and interrupt operations to a system image (SI).

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. Exemplary relationships between physical and virtual functions will be illustrated in FIGS. 6 and 7 hereafter.

FIG. 6 is an exemplary diagram illustrating physical and virtual functions of single root endpoints without native virtualization. The term "single root endpoints" refers to an endpoint that is associated with a single root complex of a single root node, i.e. a single host system. With a single root endpoint, the endpoint may be shared by a plurality of system images (SIs) associated with a single root complex, but cannot be shared among a plurality of root complexes on the same or different root nodes.

As shown in FIG. 6, the root node 600 includes a plurality of system images 610, 612, which communicate with PCIe endpoints 670-690, an I/O virtualization intermediary 630 (which is used as previously described), PCIe root complex 640, and one or more PCIe switches 650 and/or other PCIe fabric elements. The root node 600 further includes a single root PCIe configuration management (SR-PCIM) unit 620. The SR-PCIM unit 620 is responsible for managing the PCIe fabric, which includes the root complex 640, the one or more PCIe switches 650, and the like, and the endpoints 670-690. The management responsibilities of SR-PCIM 620 include determination of which functions are to be assigned to which SIs 610, 612 and the setup of the configuration space of the endpoints 670-690. The SR-PCIM 620 may configure the functions of the various endpoints 670-690 based on a SI's capabilities and input from a user, such as a system administrator, or load balancing software as to which resources are to be assigned to which SIs 610, 612. A SI's capabilities may include various factors including how much address space is available to allocate to the endpoint 670-690, how many interrupts are available to be assigned to the endpoint 670-690, and the like.

Each of the PCIe endpoints 670-690 may support one or more physical functions (PFs). The one or more PFs may be independent of each other or may be dependent upon each other in some fashion. A PF may be dependent upon another PF based on vendor defined function dependencies wherein one PF requires the operation of another PF or the result generated by another PF, for example, in order to operate properly. In the depicted example, PCIe endpoint 670 supports a single PF and PCIe endpoint 680 supports a plurality of independent PFs, i.e. $PF_0$ to $PF_N$, of different types 1 to M. A type relates to the functionality of the PF or VF, e.g., an Ethernet function and a Fiber Channel function are two different types of functions. Endpoint 690 supports multiple PFs of different types with two or more of the PFs being dependent. In the depicted example, $PF_0$ is dependent upon $PF_1$, or vice versa.

In the example shown in FIG. 6, the endpoints 670-690 are shared by the system images (SIs) 610 and 612 through the virtualization mechanisms made available by the I/O virtualization intermediary (IOVI) 630. As described previously, in such an arrangement, the IOVI 630 is involved in all PCIe transactions between the SIs 610, 612 and the PCIe endpoints 670-690. The individual PCIe endpoints 670-690 need not support virtualization in themselves since the burden of handling the virtualization is placed entirely on the IOVI 630. As a result, while known mechanisms for virtualization may be used in such an arrangement, the rate by which I/O operations may be performed is relatively slow compared to the potential for I/O rates if the IOVI 630 were not involved in every I/O operation.

Figure 7:
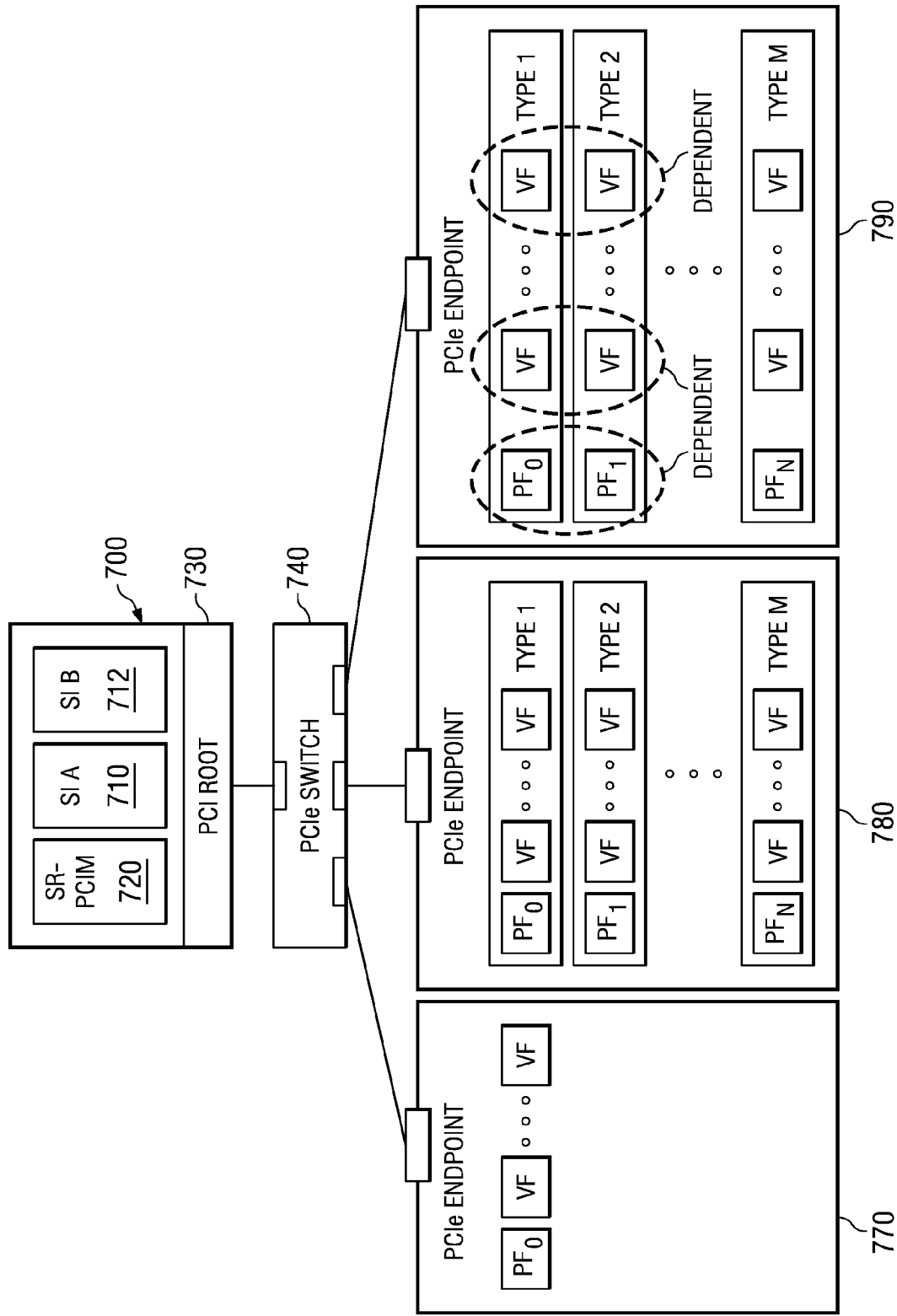
FIG. 7 is an exemplary diagram illustrating physical and virtual functions of single root endpoints enabled for native I/O virtualization.

FIG. 7 is an exemplary diagram illustrating physical and virtual functions of single root endpoints enabled for native I/O virtualization. The arrangement shown in FIG. 7 is similar to that of FIG. 6 with some important differences due to the PCIe endpoints 770-790 supporting I/O virtualization (IOV) natively, i.e. within the endpoints themselves. As a result, the I/O virtualization intermediary 630 in FIG. 6 may be effectively eliminated, except of course for configuration operations, with regard to the IOV enabled PCIe endpoints 770-790. However, if non-IOV enabled PCIe endpoints (not shown) are also utilized in the arrangement, e.g., legacy endpoints, an I/O virtualization intermediary may be used in conjunction with the elements shown in FIG. 7 to handle sharing of such non-IOV enabled PCIe endpoints between the system images 710 and 712.

As shown in FIG. 7, the IOV enabled PCIe endpoints 770-790 may support one or more independent or dependent physical functions (PFs) which in turn may be associated with one or more independent or dependent virtual functions (VFs). In this context, the PFs are used by the SR-PCIM 720 to manage a set of VFs and are also used to manage endpoint functions, such as physical errors and events. The configuration spaces associated with the PFs define the capabilities of the VFs including the maximum number of VFs associated with the PF, combinations of the PFs and VFs with other PFs and VFs, and the like.

The VFs are used by SIs to access resources, e.g., memory spaces, queues, interrupts, and the like, on the IOV enabled PCIe endpoints 770-790. Thus, a different VF is generated for each SI 710, 712 which is going to share a specific PF. VFs are generated by the endpoint 770-790 based on the setting of the number of VFs by the SR-PCIM 720 in the configuration space of the corresponding PF. In this way, the PF is virtualized so that it may be shared by a plurality of SIs 710, 712.

As shown in FIG. 7, the VFs and PFs may be dependent upon other VFs and PFs. Typically, if a PF is a dependent PF, then all of the VFs associated with that PF will also be dependent. Thus, for example, the VFs of the $PF_0$ may be dependent upon corresponding VFs of $PF_1$ With the arrangement shown in FIG. 7, the SIs 710, 712 may communicate directly, via the PCI root complex 730 and PCIe switch 740, with the IOV enabled PCIe endpoints 770-790 and vice versa without the need for involvement by an I/O virtualization intermediary. Such direct communication is made possible by virtue of the IOV support provided in the endpoints 770-790 and in the SR-PCIM 720, which configures the PFs and VFs in the endpoints 770-790.

The direct communication between the SIs and the endpoints greatly increases the speed at which I/O operations may be performed between a plurality SIs 710, 712 and shared IOV enabled PCIe endpoints 770-790. However, in order for such performance enhancements to be made possible, the PCIe endpoints 770-790 must support I/O virtualization by providing mechanisms in the SR-PCIM 720 and the physical functions (PFs) of the endpoints 770-790 for generating and managing virtual functions (VFs).

The above illustrations of a PCIe hierarchy are limited to single root hierarchies. In other words, the PCIe endpoints are only shared by SIs 710, 712 on a single root node 700 associated with a single PCI root complex 730. The mechanisms described above do not provide support for multiple root complexes sharing the PCIe endpoints. Thus, multiple root nodes cannot be provided with shared access to the resources of a PCIe endpoint. This limits the scalability of systems utilizing such arrangements since a separate set of endpoints is required for each root node.

The illustrative embodiments herein make use of multi-root I/O virtualization in which multiple PCI root complexes may share access to the same set of IOV enabled PCIe endpoints. As a result, the system images associated with each of these PCI root complexes may each share access to the same set of IOV enabled PCIe endpoint resources but with the protections of virtualization being in place for each SI on each root node. Thus, scalability is maximized by providing a mechanism for allowing addition of root nodes and corresponding PCI root complexes which may share the same existing set of IOV enabled PCIe endpoints.

Figure 8:
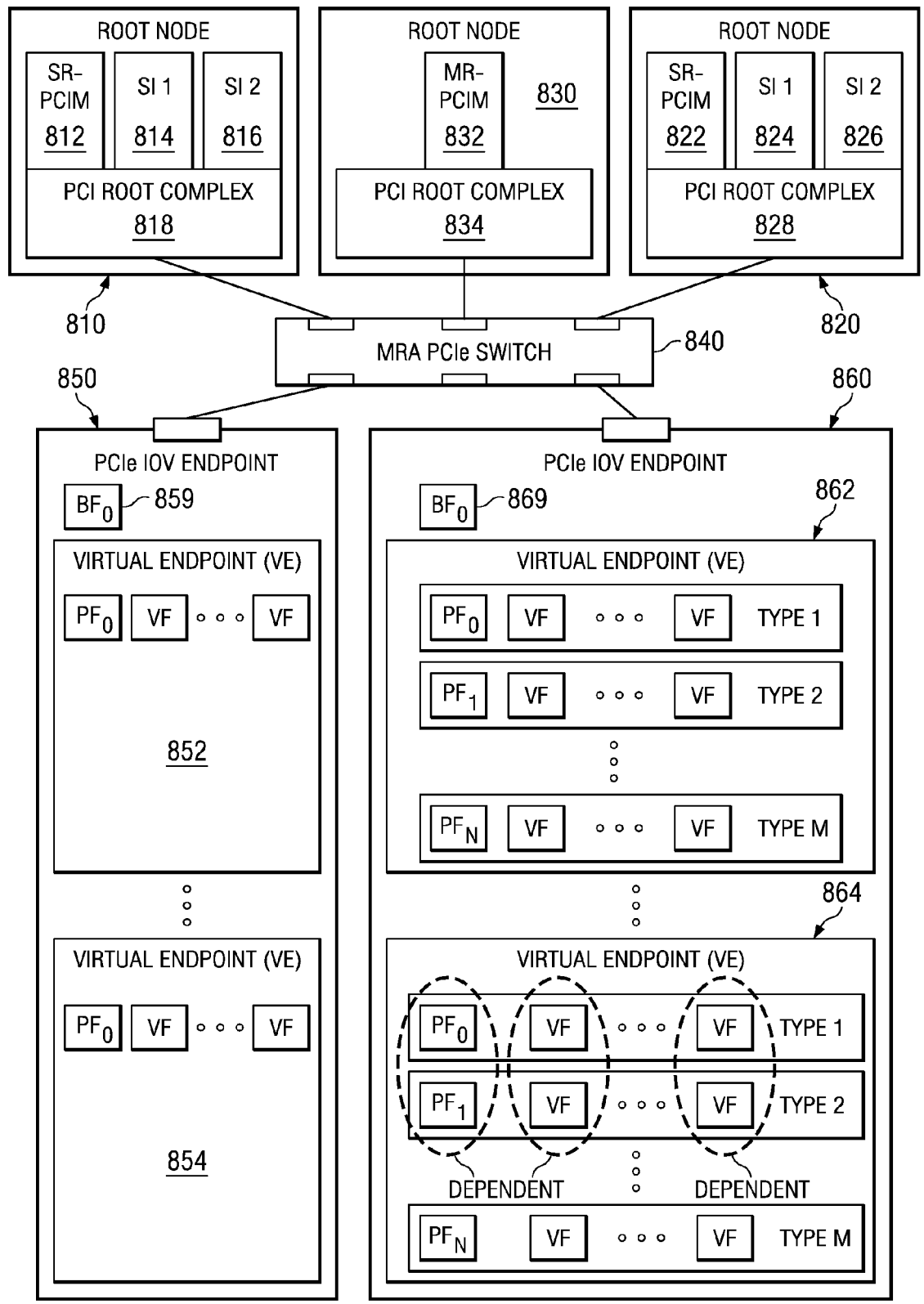
FIG. 8 is an exemplary diagram illustrating a multi-root virtualized I/O topology in accordance with one illustrative embodiment.

FIG. 8 is an exemplary diagram illustrating a multi-root virtualized I/O topology in accordance with one illustrative embodiment. As shown in FIG. 8, a plurality of root nodes 810 and 820 are provided with each root node having a single root PCI configuration manager (SR-PCIM) 812, 822, one or more system images (SIs) 814, 816, 824, and 826, and a PCI root complex 818 and 828. These root nodes 810 and 820, which may be, for example, blades in a blade server, are coupled to one or more multi-root aware (MRA) PCIe switches 840 of a PCIe switch fabric which may include one or more such MRA PCIe switches 840, and/or other PCIe fabric elements. The MRA switch 840 is of a different type than the non-MRA switch 740 in FIG. 7 in that the MRA switch 840 has connections for additional root nodes and contains the mechanisms required for keeping the address spaces of those different root nodes separate and distinct.

In addition to these root nodes 810 and 820, a third root node 830 is provided that includes a multi-root PCI configuration manager (MR-PCIM) 832 and corresponding PCI root complex 834. The MR-PCIM 832 is responsible for discovering and configuring virtual hierarchies within the multi-root (MR) topology shown in FIG. 8, as will be discussed in greater detail hereafter. Thus, the MR-PCIM 832 configures the physical and virtual functions of the endpoints with regard to multiple root complexes of multiple root nodes. The SR-PCIMs 812 and 822 configure the physical and virtual functions of their associated single root complex. In other words, the MR-PCIM sees the MR topology as a whole, while the SR-PCIM sees only its own virtual hierarchy within the MR topology, as described in greater detail hereafter.

As shown in FIG. 8, the IOV enabled PCIe endpoints 850 and 860 support one or more virtual endpoints (VEs) 852, 854, 862, and 864. A VE is a set of physical and virtual functions assigned to a root complex. Thus, for example, a separate VE 852 and 862 are provided on the IOV enabled PCIe endpoints 850 and 860 for the PCI root complex 818 of root node 810. Similarly, a separate VE 854 and 864 are provided on the IOV enabled PCIe endpoints 850 and 860 for the PCI root complex 828 of root node 820.

Each VE is assigned to a virtual hierarchy (VH) having a single root complex as the root of the VH and the VE as a terminating node in the hierarchy. A VH is a fully functional PCIe hierarchy that is assigned to a root complex or SR-PCIM. It should be noted that all physical functions (PFs) and virtual functions (VFs) in a VE are assigned to the same VH.

Each IOV enabled PCIe endpoint 850 and 860 supports a base function (BF) 859 and 869. The BF 859, 869 is a physical function used by the MR-PCIM 832 to manage the VEs of the corresponding endpoint 850, 860. For example, the BF 859, 869 is responsible for assigning functions to the VEs of the corresponding endpoints 850, 860. The MR-PCIM 832 assigns functions to the VEs by using the fields in the BF's configuration space that allows assignment of a VH number to each of the PFs in the endpoint 850, 860. In the illustrative embodiments, there can be only one BF per endpoint, although the present invention is not limited to such.

As shown in FIG. 8, each VE 852, 854, 862, and 864 may support their own set of physical and virtual functions. As described previously, such sets of functions may include independent physical functions, dependent physical functions, and their associated independent/dependent virtual functions. As shown in FIG. 8, VE 852 supports a single physical function ($PF_0$) with its associated virtual functions (VFs). VE 854 likewise supports a single physical function (PF$_O$) with its associated virtual functions (VFs). VE 862 supports a plurality of independent physical functions (PF$_O$-PF$_N$) and their associated virtual functions (VFs) VE 864, however, supports a plurality of dependent physical functions (PF$_O$-PF$_N$).

A VE 852, 854, 862, or 864 may directly communicate with the SIs 814, 816, 824, and 826 of the root nodes 810 and 820, if and only if the VE is assigned to a VH to which the SI has access, and vice versa. The endpoints 850 and 860 themselves must support single root I/O virtualization, such as described previously above, and multi-root I/O virtualization as described with regard to the present illustrative embodiments. This requirement is based on the fact that the topology supports multiple root complexes but each individual root node sees only its associated single root based virtual hierarchy.

Figure 9:
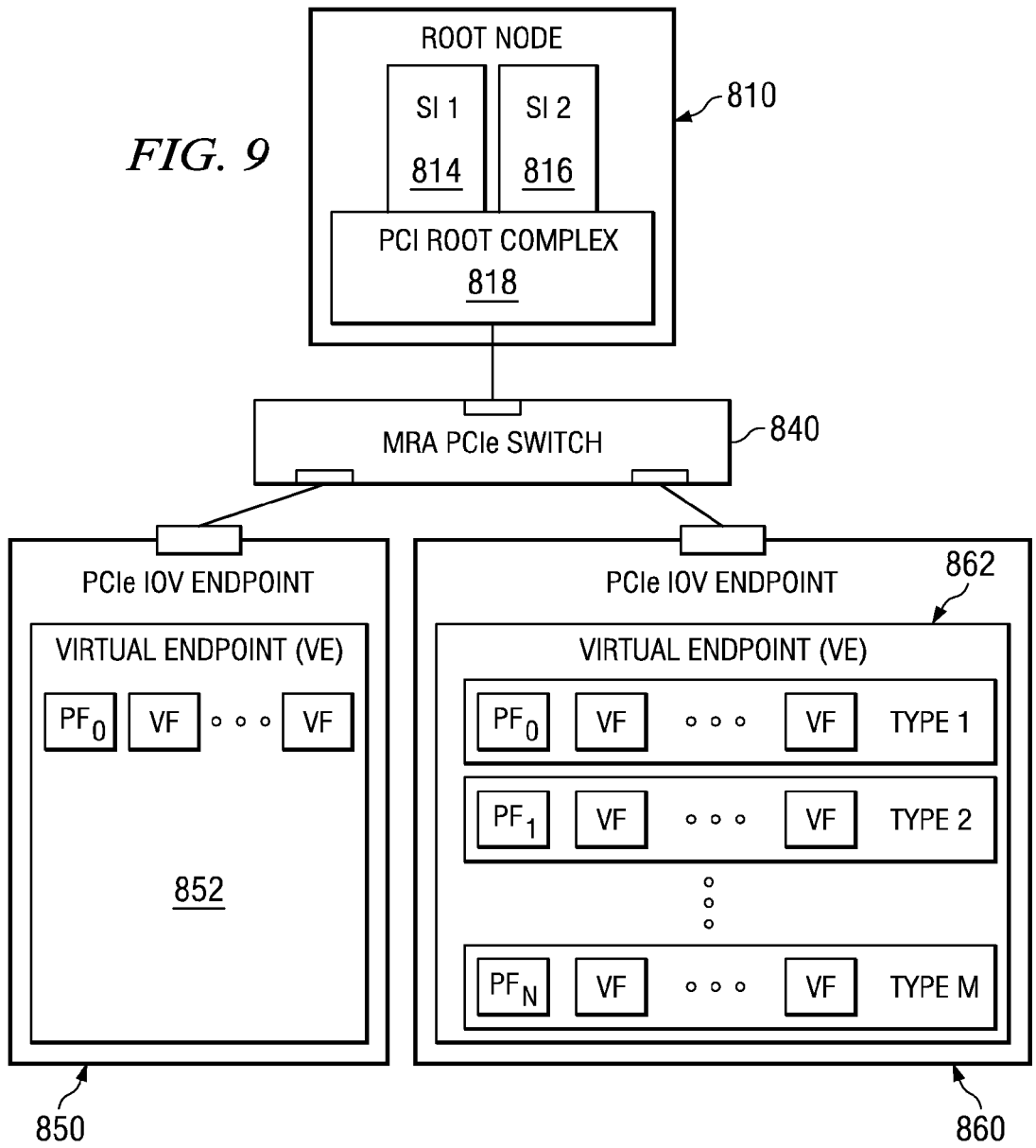
FIG. 9 is an exemplary diagram illustrating a virtual hierarchy view of a multi-root virtualized I/O topology from the viewpoint of a SR-PCIM of a root node in accordance with one illustrative embodiment.

FIG. 9 is an exemplary diagram illustrating a virtual hierarchy view of a multi-root virtualized I/O topology from the viewpoint of a root complex of a root node in accordance with one illustrative embodiment. As shown in FIG. 9, while the multi-root (MR) topology may be as shown in FIG. 8, each root complex of each individual root node views only its portion of the MR topology. Thus, for example, the PCI root complex 818 associated with root node 810 sees its host processor set, its own system images (SIs) 814, 816, the MRA switch 840, and its own virtual endpoints (VEs) 852 and 862. There is full PCIe functionality within this virtual hierarchy, however, the PCI root complex 818 does not see the VEs, root complexes, system images, etc, that are not part of its own virtual hierarchy.

Because of this arrangement, limitations are imposed on the communication between root complexes of root nodes in a MR topology. That is, since PCIe functionality is limited to the virtual hierarchy associated with the root complex, root complexes cannot communicate with one another. Moreover, the system images associated with the various root complexes cannot communicate with system images of other root complexes. In order to address such limitations, the illustrative embodiments herein provide various mechanisms to provide support for communications between virtual hierarchies and specifically, root complexes of different root nodes.

In order for a host system of the illustrative embodiments to communicate with multiple endpoints via its root complex, the host system uses a shared memory that is shared by the various endpoints and root complexes with which the host system is associated. In order to ensure proper operation of the endpoints with the host system, this shared memory must be initialized such that each endpoint that is associated with the host system is provided with its own portion of the shared memory through which various communications may be performed. The illustrative embodiments utilize a mechanism for initializing the shared memory of a host system in which the PCIe fabric is discovered and endpoints of the PCIe fabric are virtually tied to root complexes of the host systems. Each endpoint and root complex is then given its own portion of a shared memory address space of each host system to which it is virtually tied. Through these portions of the host systems' shared memories, an endpoint associated with a root complex of one host system may communicate with one or more other root complexes of other host systems.

Figure 10:
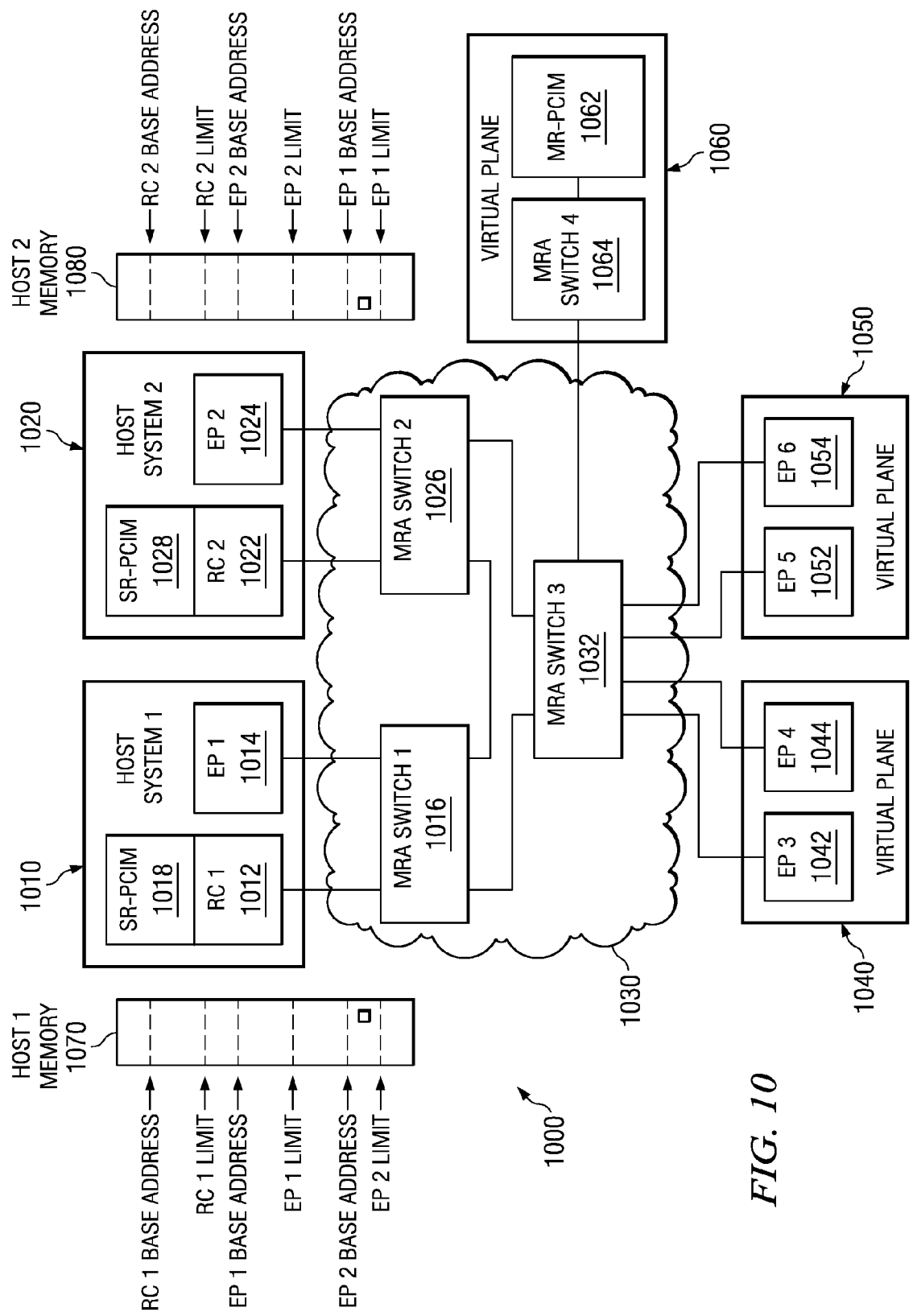
FIG. 10 is an exemplary diagram illustrating a shared memory PCIe based system in accordance with one illustrative embodiment.

FIG. 10 is an exemplary diagram illustrating a shared memory PCIe based system in accordance with one illustrative embodiment. As shown in FIG. 10, a system 1000 has a host system 1010 that comprises a first root complex (RC1) 1012 and a first endpoint (EP1) 1014, and is associated with a first multiple-root aware (MRA) switch 1016, which may also be provided as part of the host system 1010. The system 1000 has a second host system 1020 that comprises a second root complex (RC2) 1022 and a second endpoint (EP2) 1024, and is associated with a second multiple-root aware (MRA) switch 1026, which may also be provided as part of the host system 1020. Each of these host systems 1010 and 1020 may represent, for example, separate blades in a same multi-root blade cluster system 1000. Alternatively, the host systems 1010 and 1020 may be provided on separate computing devices entirely. Each host system 1010 and 1020 is in its own virtual hierarchy (VH). The host systems 1010 and 1020 are connected to one another and with other shared endpoints EP3-EP6 1042-1044 and 1052-1054, via communication links with one or more MRA switches 1016, 1026, and 1032 of a PCIe fabric 1030. The communication links associated with the host systems 1010 and 1020 and endpoints 1042-1044 and 1052-1054 may be associated with one or more virtual planes (VPs).

There are no virtual hierarchy (VH) identifiers used in a PCIe fabric to distinguish which host system 1010 and 1020 is associated with a given PCIe transaction. Instead a link local virtual plane (VP) identifier is used. Since the VP identifier is link local, RC 1's VH may have, for example, VP=4 on a link between 1032 and 1016 and VP=4 on a link between 1032 and 1042. In other words, a VH is made up of a set of PCIe components and the links that attach those components, with each of those links having a link local VP identifier used to designate which VH a given transaction is referencing.

In the depicted example, the goal is to permit the root complex 1012, and thus, the applications running in association with one or more system images associated with the root complex 1012, to communicate with an endpoint associated with another root complex, e.g., endpoint EP2 1024 associated with root complex RC2 1022. Thus, for example, EP2 1024 may be used as an endpoint by system images running on root complex RC1 1012. In this way, endpoints that are co-resident with root complexes may be shared across system images on various virtual planes and/or host systems. As a result, high performance node-to-node, i.e. host system to host system, communications and load balancing may be facilitated as well as system cost reduction by eliminating the need to go through an external networking adapter and switch, such as an InfiniBand or Ethernet switch, when communicating between the nodes.

In order to permit endpoints to be shared by system images across host systems, a multi-root PCI configuration manager (MR-PCIM) 1062, provided in one of the host systems 1010 or 1020, or a separate host system 1060, initializes the host systems' memory spaces 1070 and 1080 to establish base and limit apertures for the root complexes and endpoints. The MR-PCIM 1062 accesses the PCIe fabric 1030 via the MRA switch 1064 and one or more MRA switches 1032 in the PCIe fabric 1030.

The MR-PCIM 1062 traverses the links of the PCIe fabric 1030 through the various interconnected switches, in a manner generally known in the art, to identify the root complexes and endpoints associated with the PCIe fabric 1030. With the traversal performed by the illustrative embodiments, however, all of the root complexes (RCs), with the exception of the root complex (RC) performing the discovery fabric traversal operation, are treated as endpoints during the discovery fabric traversal.

As the MR-PCIM 1062 traverses the PCIe fabric, it performs a number of checks between the root complexes and the endpoints to determine if a given root complex is associated with a given endpoint. From the resulting information, the MR-PCIM 1062 generates one or more virtual PCI tree data structures that tie the endpoints available on the PCIe fabric 1030 to each of the root complexes. Endpoints that are associated with the same root complex, are associated with each other in the virtual PCI tree data structures.

After the MR-PCIM 1062 discovers and configures the fabric, the respective RCs allow their associated SR-PCIMs 1018 and 1028 to discover and configure the VHs. Each SR-PCIM 1018, 1028 assigns, for each given endpoint, a base address and limit within the PCIe memory address space(s) to which it belongs, e.g., the PCIe memory address space(s) associated with host system 1 memory 1070 and host system 2 memory 1080. The SR-PCIM 1018, 1028 writes this base address and limit to the Base Address Register (BAR) of the EP. Work requests and completion messages may then be written to these portions of the PCI memory address space(s) in order to facilitate communication between the various root complexes and the endpoints across host systems 1010 and 1020, as will be described in greater detail hereafter.

As mentioned above, with the illustrative embodiments, the MR-PCIM 1062 performs a number of checks between the root complexes and the endpoints as it traverses the PCIe fabric 1030. For example, the MR-PCIM 1062 accesses the PCIe configuration space of each function, physical function and virtual function of an EP, the PCIe configuration spaces being located in the EPs, as defined by the PCI specifications. The MR-PCIM also accesses the Vital Product Data (VPD) fields for each endpoint and stores the VPD information for later comparison, such as in a non-volatile storage area (not shown) coupled to the MR-PCIM 1062, for example.

VPD is the information that uniquely defines items such as hardware, software, and microcode elements of a system. The VPD provides the system with information on various field replaceable units (FRUs) including vendor name, part number, serial number, and other detailed information that is useful for administration, asset management, and anything that requires unique identification of the PCI device. The VPD information typically resides in a storage device, e.g., a serial EEPROM, in a PCI device, such as an endpoint 1014, 1024. More information regarding VPD may be obtained from the PCI Local Bus Specification, Revision 3.0 available at www.pcisig.com.

The MR-PCIM 1062, after having retrieved and stored the VPD information for each of the endpoints 1014, 1024, 1042, 1044, 1052, and 1054, identifies which EP's and RC's reside on the same hardware device, e.g. blade. For example, the MR-PCIM 1062 accesses the VPD information of a MRA switch 1016, 1026, 1032 which contains a co-residency field that indicates that it is associated with a hardware device which holds an RC and an EP. The MRA switch 1016, 1026, 1032 stores the VH assigned to the RC which may then be used to determine which EPs and RCs reside on the same hardware device.

Figure 11A:
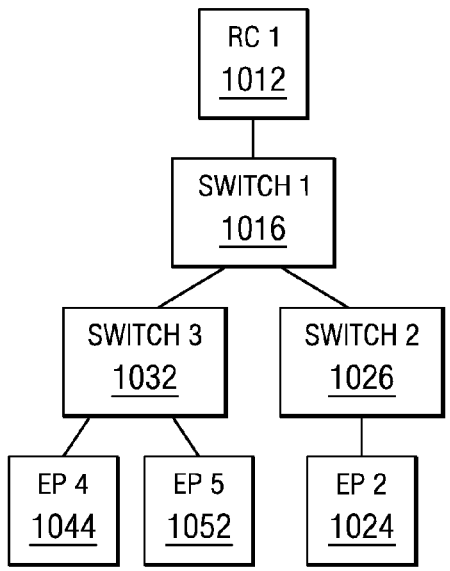
FIGS. 11A and 11B are diagrams representing exemplary virtual PCI tree data structures in accordance with one illustrative embodiment.
Figure 11B:
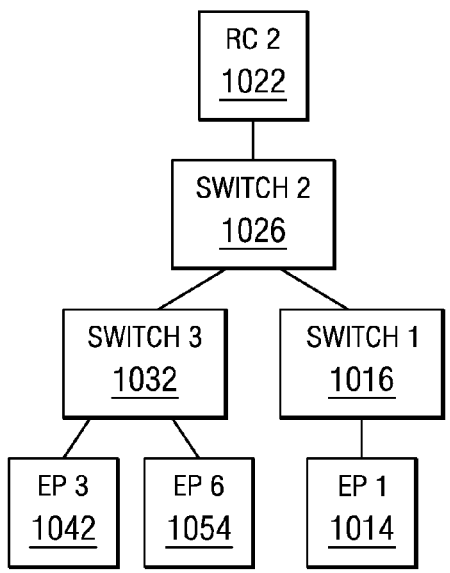

After determining that an EP co-exists with a RC on the same host, the MR-PCIM 1062 creates one or more virtual PCI tree data structures, such as illustrated in FIGS. 11A and 11B. As shown in FIGS. 11A and 11B, the virtual PCI tree data structure ties the endpoints available on the PCIe fabric to each root complex.

It is assumed in the virtual PCI tree data structure shown in FIG. 11A that the endpoints EP2 1024, EP4 1044, and EP5 1052 are associated with root complex RC1 1012 via assignments indicated to the MR-PCIM 1062 by the user. The VPD matching described above is only performed to allow a RC to determine that an EP is physically residing on the RC's host. This tells the RC that the EP is accessible to the RC through standard PCI memory mapped addressing in the RC's address space. This is a physical association. With the virtual PCI tree data structures, logical associations are specified by way of a user indicating that he/she wants the MR-PCIM 1062 to create such logical associations.

Similarly, it is assumed in FIG. 11B that the endpoints EP1 1014, EP3 1042, and EP6 1054 are associated with root complex RC1 1012 via user input specifying logical associations, and their VPD information and the comparisons made by the MR-PCIM 1062. Thus, in the depicted example shown in FIG. 11A, endpoint EP2 1024 is associated with, or tied with, root complex RC1 1012 via switch 2 1026 and switch 1 1016. Endpoints EP4 1044 and EP5 1052 are associated with root complex RC1 1012 via switch 3 1032 and switch 1 1016. In FIG. 11B, endpoint EP1 1014 is associated with, or tied with, root complex RC2 1022 via switch 1 1016 and switch 2 1026. Endpoints EP3 1042 and EP6 1054 are associated with root complex RC2 1022 via switch 3 1032.

Based on these virtual PCI tree data structures, the MR-PCIM 1062 assigns each endpoint a base address and limit within the PCIe memory address space(s) it belongs to. The base addresses may be stored in the endpoints' Base Address Registers (BARs). For example, EP1 1014 is accessible through two PCIe memory address spaces 1070 and 1080. In host system 1 1010, EP1 1014 is accessible by the host system's processor (not shown) through the host system's memory 1070 address space. In host system 2 1020, EP1 1014 has a PCIe aperture, defined by the EP1 base address and limit, in host system 2's memory 1080 address space that is accessible via memory mapped I/O through PCI bus memory addresses. The processor of host system 1 1010 may use a memory address translation and protection table (not shown), such as may be provided in a virtualization intermediary, such as a hypervisor, the root complex 1012, or the like, to map the PCIe memory addresses seen by the processor of host system 2 1020 into host system 1 memory addresses, for example.

Similarly, the endpoint EP2 1024 is accessible through two PCIe memory address spaces for host system memories 1070 and 1080. In host system 2 1020, EP2 1024 is accessible by host system 2's processor through host system 2's real memory addresses for its memory 1080. In host system 1 1010, EP2 1024 has a PCIe aperture, defined by the base address and limit for EP2 1024, in host system 1's memory 1070 that is accessible as memory mapped I/O through PCI bus memory addresses. Host system 2 1020 may use a memory address translation and protection table (not shown) to map the PCIe memory addresses seen by host system 1 1010 into host system 2 real memory addresses.

Similar portions of host system memories 1070 and 1080 may be initialized for the root complexes RC1 1012 and RC2 1022. For example, in host system 1 1010, RC1 1012 is accessible by host system 1's processor through host system 1's real memory addresses for host system 1's memory 1070. RC1 1012 has a PCIe aperture in host system 2's memory space that is accessible via direct memory access (DMA) I/O through host system 1's PCI bus memory addresses. Host system 1 1010 may use a memory address translation and protection table (not shown) to map the PCIe memory addresses seen by host system 2 1020 into host system 1 real memory addresses.

Similarly, in host system 2 1020, RC2 1022 is accessible by host system 2's processor through host system 2 real memory addresses for memory 1080. RC2 1022 has a PCIe aperture in host system 1's memory 1070 that is accessible as DMA I/O through host system 2's PCI bus memory addresses. Host system 2 1020 can use a memory address translation and protection table (not shown) to map the PCIe memory addresses seen by host system 1 1010 into host system 2 real memory addresses.

Thus, the mechanism of the illustrative embodiments provide for the initialization of memory spaces in the host systems such that an endpoint may be accessible by more than one root complex in a plurality of host systems. The portions of the memory spaces assigned to the various endpoints may then be utilized by the root complexes to send requests and completion messages to and from the endpoints.

Figure 12:
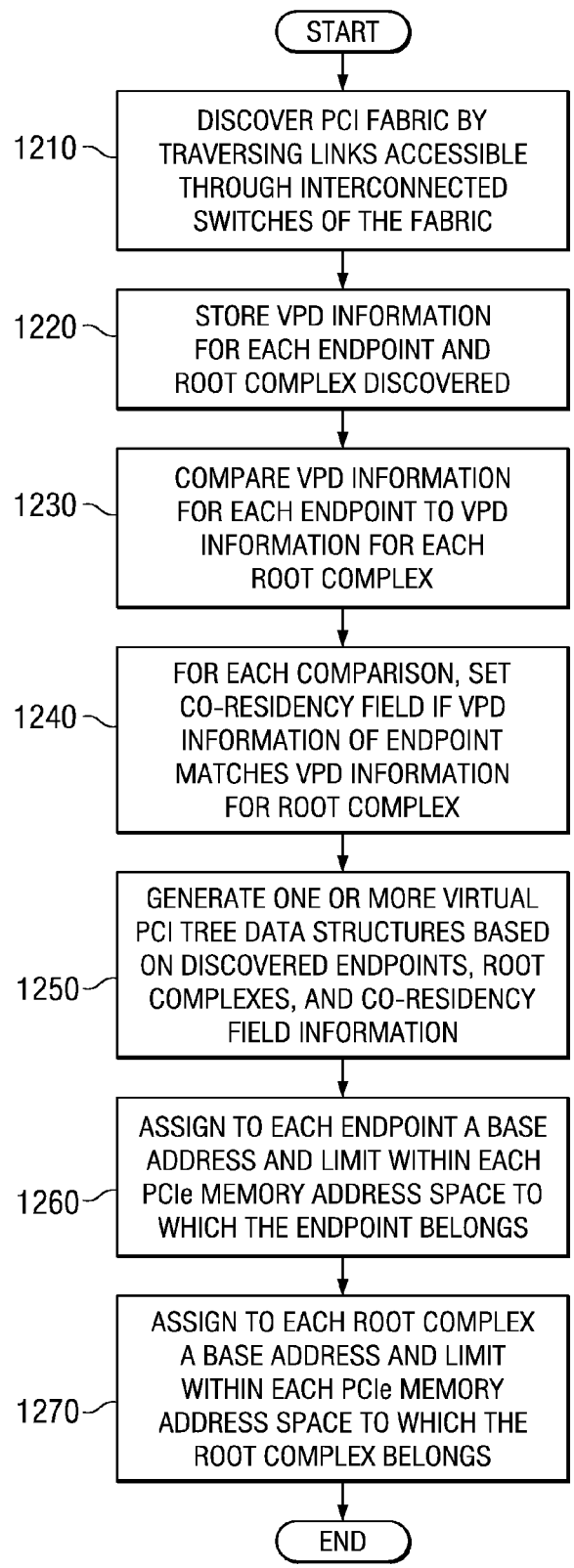
FIG. 12 is a flowchart outlining an exemplary operation for initializing memory address spaces of host systems for sharing of endpoints in accordance with one illustrative embodiment.

FIG. 12 is a flowchart outlining an exemplary operation for initializing memory address spaces of host systems for sharing of endpoints in accordance with one illustrative embodiment. It will be understood that each block of the flowchart illustration in FIG. 12, and flowchart illustrations described hereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 12, the operation starts with a MR-PCIM discovering the PCIe fabric by traversing all the links accessible through interconnected switches of the PCIe fabric (step 1210). VPD information for each of the endpoints and root complexes discovered during the discovery of the PCIe fabric is stored (step 1220).

The MR-PCIM compares VPD information for each endpoint to the VPD information for each root complex to determine if a given endpoint is associated with a given root complex (step 1230). For each comparison, the MR-PCIM sets a corresponding co-residency field if the VPD information matches for the endpoint and the root complex (step 1240). Based on the discovered endpoints and root complex information and the settings of the co-residency fields for each of the comparisons, the MR-PCIM generates one or more virtual PCI tree data structures (step 1250).

Based on the generated virtual PCI tree data structure(s), the MR-PCIM assigns to each endpoint a base address and limit within each PCIe memory address space to which the endpoint belongs (step 1260). Based on the generated virtual PCI tree data structure(s), the MR-PCIM assigns to each root complex a base address and limit within each PCIe memory address space to which that root complex belongs (step 1270). The operation then terminates.

Having initialized the memory address spaces of the host systems such that endpoints may be accessible by root complexes across host systems, these memory address spaces may then be used to allow system images, and their corresponding applications, associated with these root complexes to communicate with the endpoints. One way in which such communication is facilitated is via a queuing system that utilizes these initialized memory address spaces in the various host systems. Such a queuing system may comprise a work queue structure and a completion queue structure. Both the work queue structure and the completion queue structure may comprise a doorbell structure for identifying a number of queue elements (either work queue elements (WQEs) or completion queue elements (CQE) depending upon whether the queue structure is a work queue structure or a completion queue structure), a base address for the start of a queue, a limit address for an end of the queue, and an offset which indicates the next WQE or CQE to be processed in the queue. Both the work queue structure and the completion queue structure may be used to both send and receive data.

Figure 13:
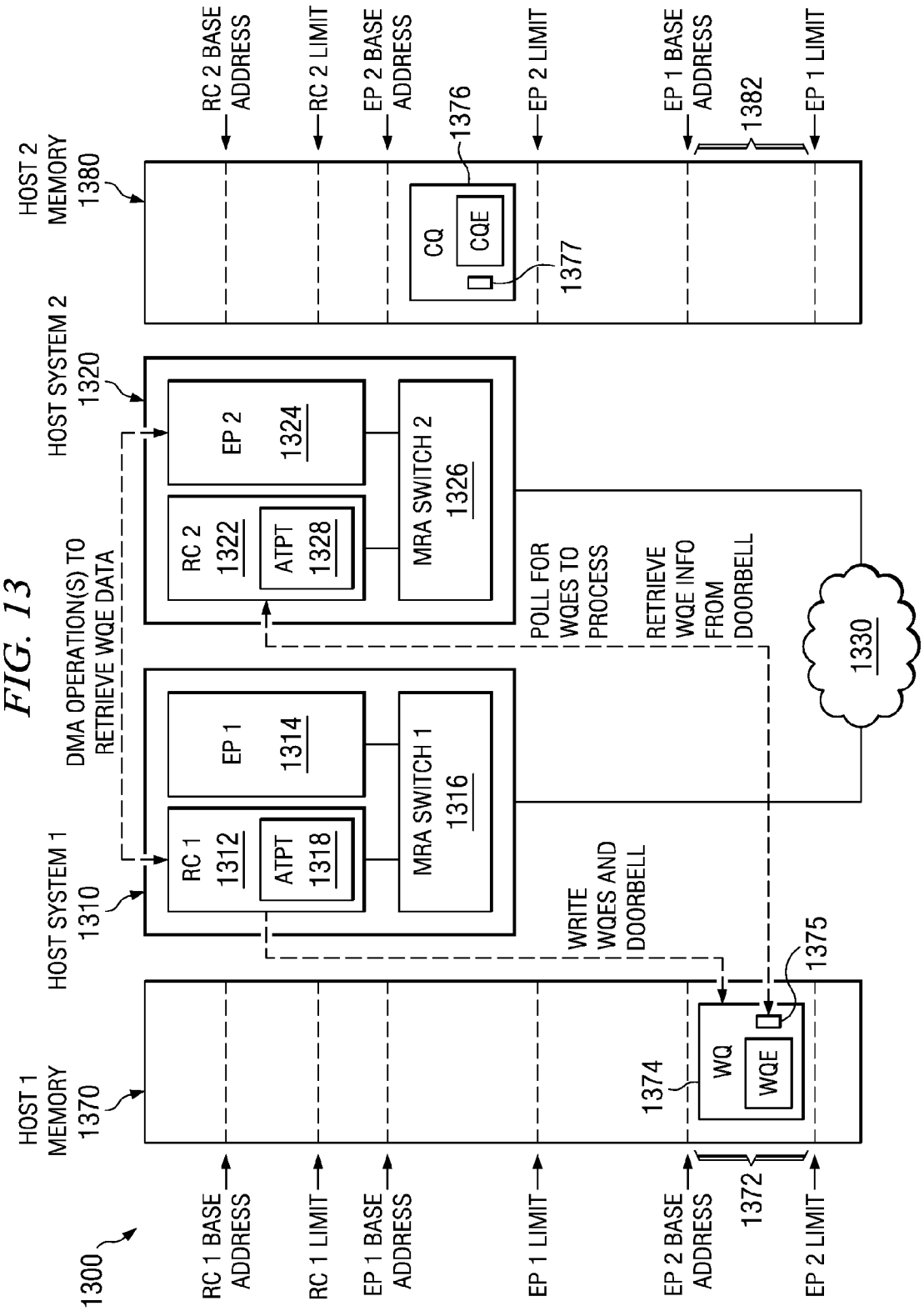
FIG. 13 is an exemplary block diagram illustrating a process for sending a work queue element (WQE) from a first host system to a second host system in accordance with one illustrative embodiment.

FIG. 13 is an exemplary block diagram illustrating a process for sending a work queue element (WQE) from a first host system to a second host system in accordance with one illustrative embodiment. It is assumed, for purposes of this description, that a system is established having host systems, e.g., a first host system 1310 and a second host system 1320, with multiple shared PCI root complexes, e.g., RC1 1312 and RC2 1322, connected by a PCIe fabric 1330, which may include MRA switches 1316 and 1326 as well. It is further assumed that an endpoint, e.g., EP2 1324, residing in the second host system 1320 with root complex RC2 1322, is to be shared with a root complex RC1 1312 of a first host system 1310 across the PCIe fabric 1330 and is appropriately mapped onto the internal memory 1380 address space of the second host system 1320 and the first host system's PCI bus memory address space. This system configuration may be achieved, for example, by using the initialization mechanisms described previously with regard to FIGS. 10-12, for example.

As shown in FIG. 13, the endpoint EP1 1314 is accessible through memory spaces associated with the two host system memories 1370 and 1380. On a first host system 1310, the endpoint EP1 1314 is accessible by the first host system's processor through the first host system's real memory addresses for the first host system's memory 1370. On the second host system 1320, the endpoint EP1 1314 has a PCIe aperture 1382 on the second host system's memory 1380 that is accessible as memory mapped I/O through PCI bus memory addresses. The first host system 1310 can use a memory address translation and protection table (ATPT) 1318 to map the PCIe memory addresses seen by the second host system 1320 into real memory addresses for the first host system's memory space 1370.

Similarly, the endpoint EP2 1324 is accessible through the two host system memory spaces 1370 and 1380. On the second host system 1320, the endpoint EP2 1324 is accessible by the second host system's processor through the second host system's real memory addresses and memory address space 1380. On the first host system 1310, the endpoint EP2 1324 has a PCIe aperture 1372 on the first host system's memory 1370 that is accessible as memory mapped I/O through PCI bus memory addresses. The second host system 1320 may use a memory address translation and protection table (ATPT) 1328 to map the PCIe memory addresses sent by the first host system 1310 to real memory addresses of the second host system's memory space 1380.

A work queue structure 1374 may comprise a doorbell structure 1375 used to pass a number of WQEs, a base address for the start of the queue, a limit address for the end of the queue, and an offset which indicates the next WQE to be processed in the work queue. Similarly, a completion queue structure 1376 may comprise a doorbell structure 1377 used to pass the number of CQEs, a base address for the start of the queue, a limit address for the end of the queue, and an offset which indicates the next CQE to be processed in the completion queue.

In order to send a WQE from the first host system 1310 to the second host system 1320, the first host system 1310 initiates the process by inserting one or more WQEs into its send work queue 1374. Each WQE contains a list of data segments, where each data segment comprises a base address and a limit address that are both in the second host system's PCIe memory bus address space and are also mapped, via an address translation and protection table (ATPT), to real memory addresses in the first host system's memory space 1370.

The first host system 1310 then writes the number of WQEs that are being sent into endpoint EP2's PCIe address for the doorbell structure 1375. The address for this doorbell structure is mapped, via an ATPT, into the first host system's PCIe memory bus address space and is also mapped to real memory addresses in the second host system's memory space 1380. When the doorbell write operation completes, the RC of the second host system 1320 either polls, or gets an interrupt and then polls, to retrieve the doorbell structure 1375 through the first host system's real memory address space 1380. That is, the RC of the second host system 1320 may be configured to periodically poll the address for the doorbell structure 1375 to determine if new WQEs are to be processed. Alternatively, the setting of the doorbell structure 1375 by the first host system 1310 may generate an interrupt to the second host system 1320 to inform the RC of the second host system 1320 of the new WQEs available for processing. The RC of the second host system 1320 may then poll the doorbell structure 1375 for the new WQEs' information and process them accordingly.

The endpoint EP2 1324 then performs PCIe DMA operations to root complex RC1 1312 to retrieve the WQEs. Each DMA operation uses the first host system's PCIe memory bus address space and places the results of the DMA operation into the second host system's memory 1380 that is accessible on the second host system 1320 through its real memory address space. Thus, using the initialized shared memories of the host systems 1310 and 1320, communication of work queue elements between root complexes and endpoints in different host systems 1310 and 1320 is facilitated.

Figure 14:
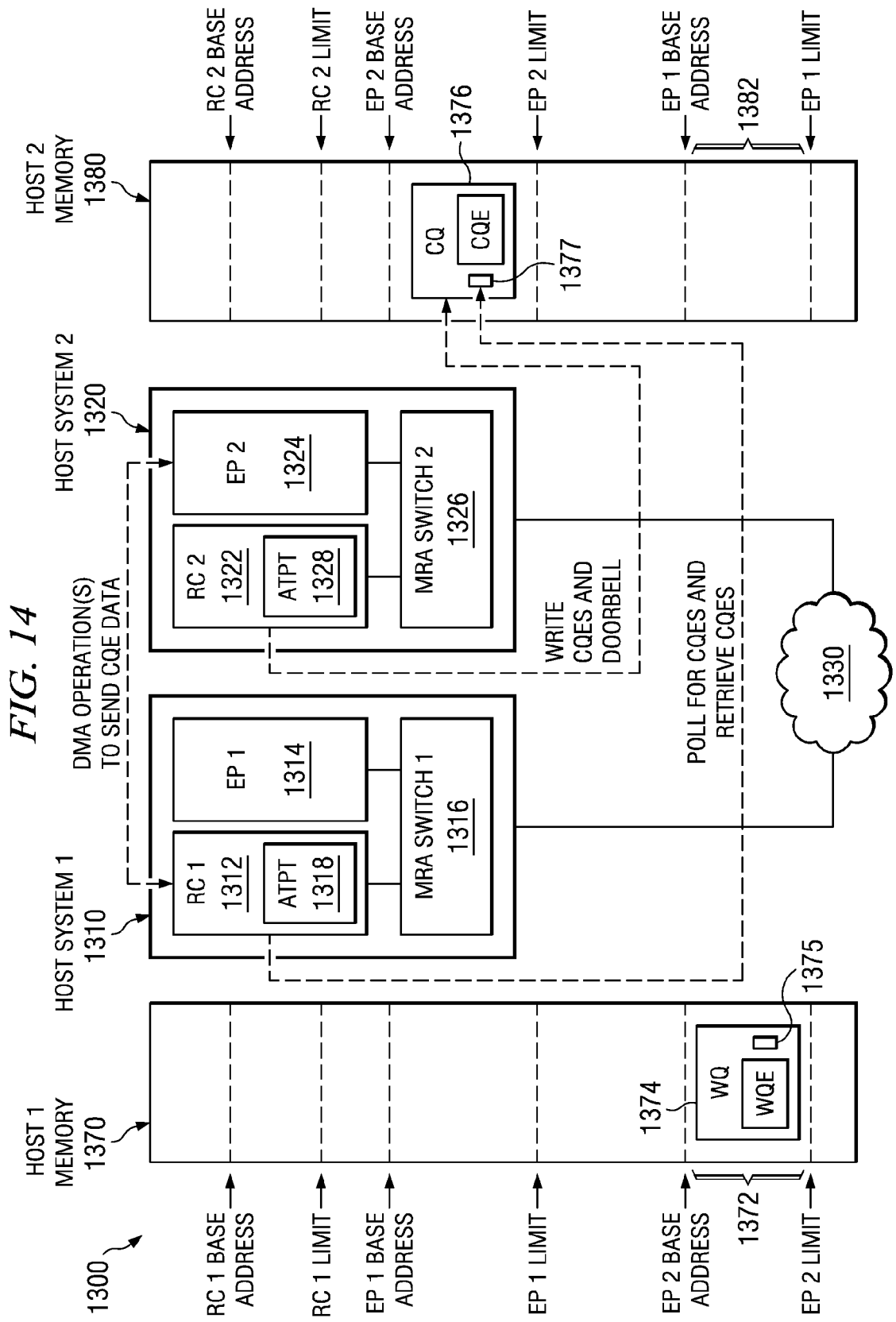
FIG. 14 is an exemplary block diagram illustrating a process for sending a completion queue element (CQE) from the second host system to the first host system in accordance with one illustrative embodiment.

FIG. 14 is an exemplary block diagram illustrating a process for sending a completion queue element (CQE) from the second host system 1320 to the first host system 1310 in accordance with one illustrative embodiment. As shown in FIG. 14, once the work associated with a WQE, or group of WQEs, is completed, the endpoint EP2 1324 performs one or more PCIe DMA operations to root complex RC1 1312 to send one or more CQEs to the root complex RC1 1312. The doorbell may be used in the sense that RC1 1312 may poll or wait for an interrupt indicating a CQE is available.

Each DMA operation uses the first host system's PCIe memory bus address space and places the results into memory 1370 on the first host system 1310 that is accessible on the first host system 1310 through its real memory address space. The results are preferably stored in a DMA-addressable portion of memory 1370, the DMA-addressable portion being at different locations in memory 1370 depending upon the particular OS utilized.

Figure 15:
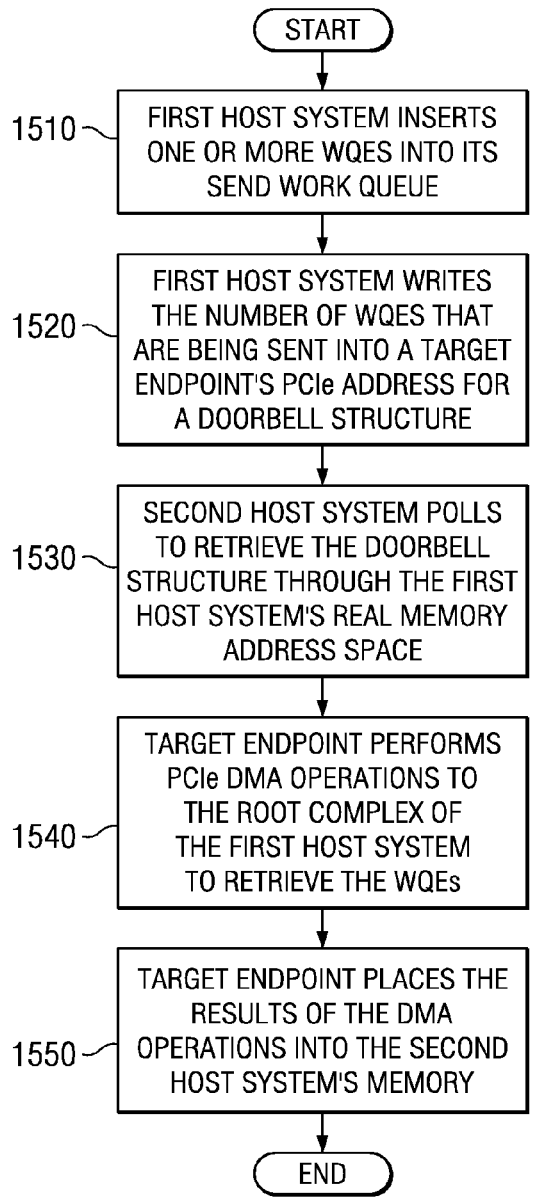
FIG. 15 is an exemplary flowchart outlining an exemplary operation for transmitting a WQE between a root complex of a first host system and an endpoint associated with a second host system in accordance with one illustrative embodiment.

FIG. 15 is an exemplary flowchart outlining an exemplary operation for transmitting a WQE between a root complex of a first host system and an endpoint associated with a second host system in accordance with one illustrative embodiment. As shown in FIG. 15, the operation starts with a first host system inserting one or more WQEs into its send work queue (step 1510). The first host system then writes the number of WQEs that are being sent into a target endpoint's PCIe address for a doorbell structure (step 1520). When the doorbell write operation completes, a second host system either polls, or gets an interrupt and then polls, to retrieve the doorbell structure through the first host system's real memory address space (step 1530).

The target endpoint then performs PCIe DMA operations to the root complex of the first host system to retrieve the WQEs (step 1540). The target endpoint then places the results of the DMA operations into the second host system's memory (step 1550). The operation then terminates.

Figure 16:
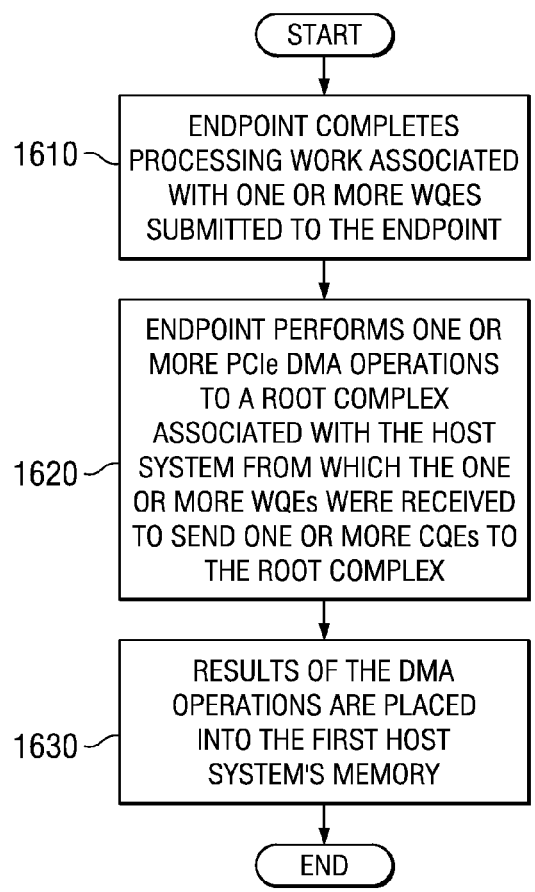
FIG. 16 is an exemplary flowchart outlining an exemplary operation for transmitting a CQE from an endpoint of a second host system to a root complex of a first host system in accordance with one illustrative embodiment.

FIG. 16 is an exemplary flowchart outlining an exemplary operation for transmitting a CQE from an endpoint of a second host system to a root complex of a first host system in accordance with one illustrative embodiment. The operation starts with an endpoint completing the processing work associated with one or more WQEs submitted to the endpoint (step 1610). The endpoint then performs one or more PCIe DMA operations to a root complex associated with the host system from which the one or more WQEs were received to send one or more CQEs to the root complex (step 1620). The results of the DMA operations are placed into the first host system's memory (step 1630). The operation then terminates.

Thus, the shared memories of the illustrative embodiments may be used to provide a queuing structure through which work requests and completion messages may be exchanged between root complexes and endpoints on different host systems. Thus, a root complex may communicate with endpoints on host systems different from the host system on which the root complex is provided, and vice versa.

In accordance with the illustrative embodiments herein, a transaction oriented protocol may be established for using the shared memories of the illustrative embodiments to communicate between root complexes and endpoints of the same or different host systems. The transaction oriented protocol specifies a series of transactions to be performed by the various elements, e.g., root complex or endpoint, to push or pull data, as will be described hereafter.

Returning to FIG. 13, the description above regarding the manner by which WQEs are provided to an endpoint and CQEs are returned to a root complex is one example of a pull-pull-push protocol. That is, the endpoint EP2 1324 of the second host system 1320, in response to the writing of the doorbell structure 1375 by the first host system 1310, uses PCIe DMA operations to pull the WQEs from the first host system's shared memory 1370. These WQEs provide the "commands" for the operations that are to be performed. Based on the segment information stored in the WQEs, the endpoint EP2 1324 of the second host system 1320 pulls the corresponding data from work queue structure 1374 in the first host system's shared memory 1370. Once the work corresponding to the WQEs is complete, the endpoint EP2 1324 of the second host system 1320 pushes a CQE to the root complex RC1 1312 of the first host system 1310 using one or more PCIe DMA operations. Thus, a pull-pull-push transaction protocol is utilized in the example of FIG. 13 described above.

Figures 17, 19:
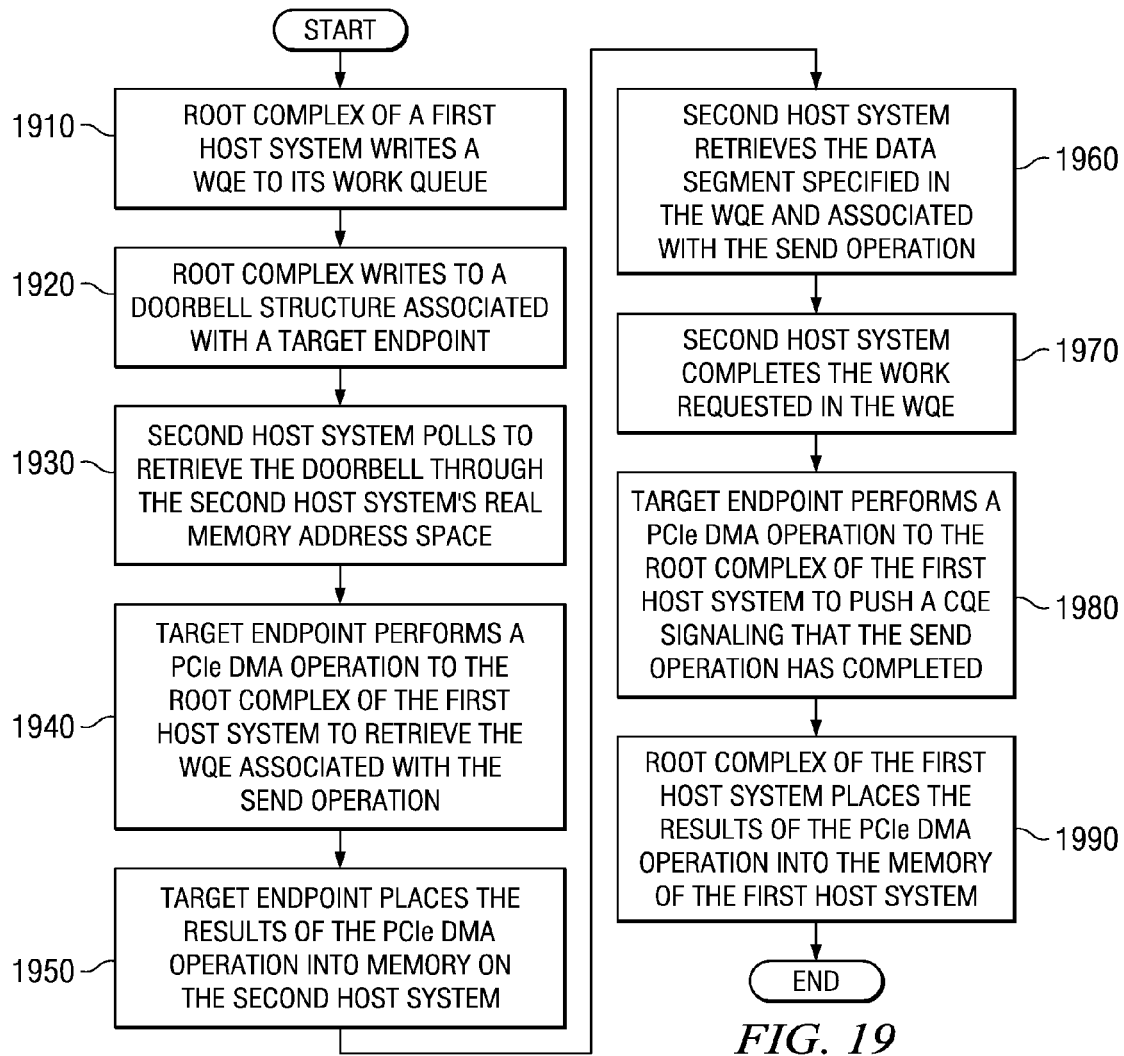
FIG. 17 is an exemplary table illustrating the various possible combinations of transactions that may be used to perform communications between root complexes and endpoints of the same or different host systems.
FIG. 19 is a flowchart outlining an exemplary operation for performing a pull transaction using a socket based communication connection in accordance with one illustrative embodiment.

Other possible combinations of the pull and push transactions are possible for the establishment of different transaction protocols. FIG. 17 is an exemplary table illustrating the various possible combinations of transactions that may be used to perform communications between root complexes and endpoints of the same or different host systems. As shown in FIG. 17, any combination of pull and push transactions may be utilized with the mechanisms of the illustrative embodiments to thereby establish a transaction protocol for the use of the shared memories of the illustrative embodiments.

The root complex and the endpoints are responsible for enforcing a selected protocol. For example, the OS system stack and the endpoints perform the operations for pulling and pushing data as part of the selected transaction protocol, such as previously described. The selection of a protocol to utilize is dependent on the particular PCIe fabric utilized by the endpoints, e.g., InfiniBand or Ethernet fabric. The particularities of the protocol may be determined according to a programming choice, e.g., whether to use polling, interrupt processing, or a combination of polling and interrupt processing.

The mechanisms of the illustrative embodiments may further be used to support socket protocol based communication between root complexes and endpoints of the same or different host systems via the shared memories described above. Such socket protocols may be used when a constant connection is to be present. The determination as to whether to use socket protocols or transaction-based protocols, such as the push-pull transactions described above, may be made based on desired efficiency and reliability.

With socket protocols, a work queue in the host systems may be used to listen for incoming socket initialization requests. That is, a first host system that wishes to establish a socket communication connection with a second host system may generate a socket initialization request WQE in its work queue and informs the second host system that the socket initialization request WQE is available for processing. The second host system may then accept or deny the request. If the second host system accepts the request, it returns the second half of the socket's parameters for use by the first host system in performing socket based communications between the first and second host systems. Such communications may involve, for example, pull transactions and/or push transactions between the host systems.

Figure 18:
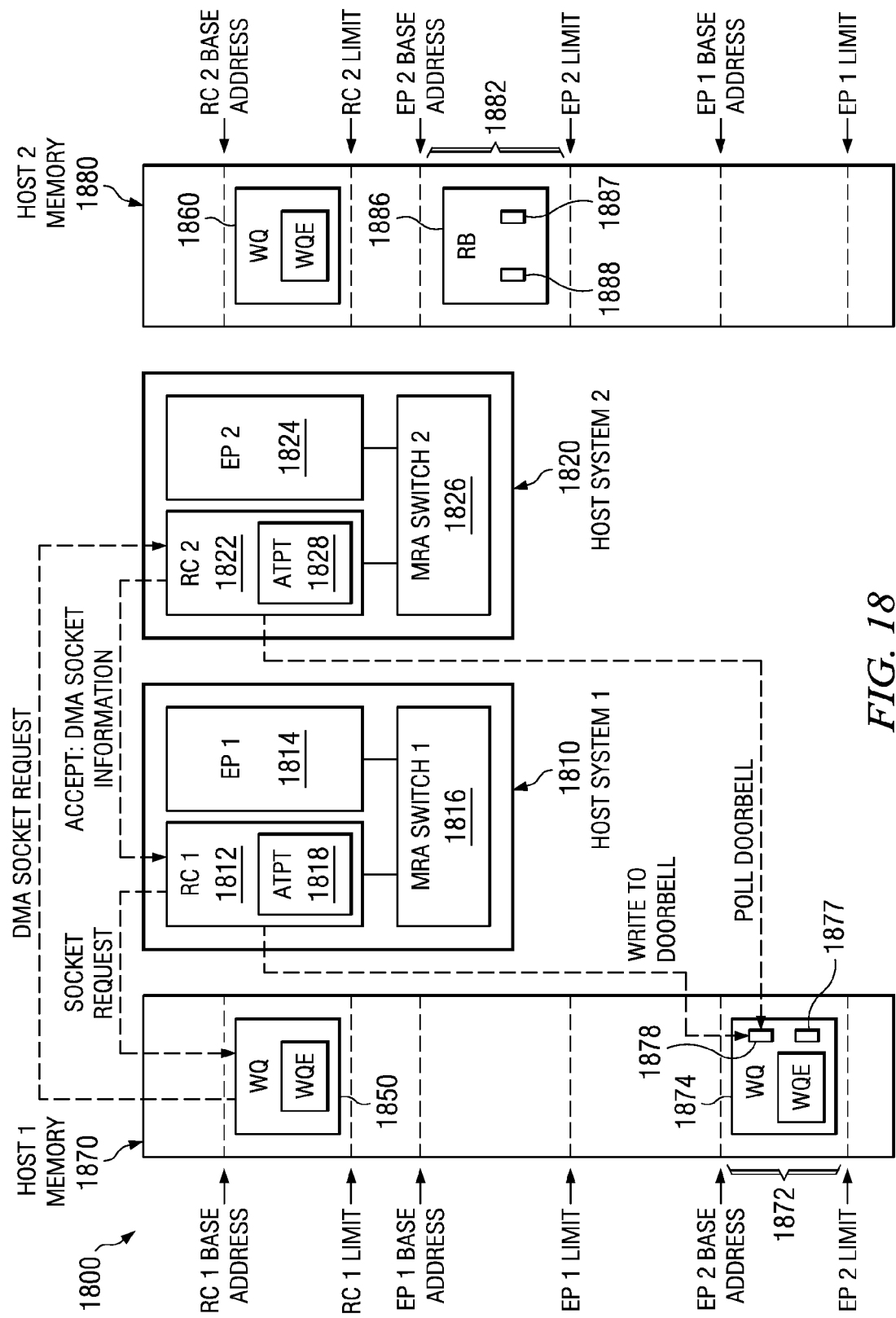
FIG. 18 is an exemplary block diagram illustrating a process for establishing sockets and performing socket-based communication between a first host system to a second host system in accordance with one illustrative embodiment.

FIG. 18 is an exemplary block diagram illustrating a process for establishing sockets and performing socket-based communication between a first host system and a second host system in accordance with one illustrative embodiment. In a socket based implementation of the illustrative embodiments, endpoints, such as EP2 1824, on a host system, e.g., host system 1810, contain a receive buffer 1876, a buffer full flag 1877, and a doorbell structure 1878. The buffer full flag 1877 and the doorbell structure 1878 may comprise addresses in memory that serve to indicate that an event has happened. The transmitter host system, e.g., host system 1810, writes to the doorbell structure 1878 through a PCIe aperture 1872 in the memory 1870 of the receiver host system 1820 accessible by the transmitter host system's root complex RC1 1812, corresponding to the connecting endpoint, e.g., endpoint EP2 1824.

As described previously, during initialization of the shared memories of the host system to facilitate the sharing of endpoints across a plurality of root complexes on the same or different host systems, vital product data (VPD) information is read for each of the discovered root complexes and endpoints in order to generate the virtual PCI tree data structures. This VPD information may include a field indicating whether the particular root complex or endpoint supports sockets over PCIe. This information may be used to identify with which endpoints sockets may be established for socket-based communication in accordance with one illustrative embodiment.

Thus, during initialization, the first host system 1810 may determine that the endpoint EP2 1824 supports sockets over PCIe, for example, through a vendor specific field in the VPD for endpoint EP2 1824, the VPD information in the EP being accessible by the MR-PCIM as previously described above as well as by the host system itself. Similarly, the second host system 1820 may determine that the endpoint EP1 1814 supports sockets over PCIe through its vendor specific field in the VPD information for endpoint EP1 1814.

Each host system 1810 and 1820 has a work queue (WQ) 1850 and 1860 that it uses to listen for incoming sockets initialization requests. For example, the second host system 1820, i.e. the receiving host system, either blocks and waits for a socket initialization request to surface on its work queue 1860 or polls the doorbell structure 1878 of the endpoint EP2 1824 to determine if a socket initialization request has arrived. The socket initialization request contains a base, limit, and starting offset into the work queue 1850 to be used for the first host system's half of the socket.

The first host system 1810, i.e. the sending host system, may generate a socket initialization request in its work queue 1850 and may write into the endpoint EP2 1824 doorbell structure 1878 indicating a socket initialization request WQE is available. Upon retrieving the data in the doorbell structure 1878, the second host system's endpoint EP2 1824 may perform a PCIe DMA operation to retrieve the socket initialization request from the first host system's work queue 1850 using the root complex RC1's PCIe bus memory addresses which are accessible by the endpoint EP2 1824.

The second host system 1820 may then parse the socket initialization request and determine whether to accept or deny the socket initialization request in an application or operating system specific manner. If the second host system 1820 denies the socket initialization request, the second host system 1820 sends a non-connection response PCIe DMA to the first host system's root complex RC1 1812 and, if desired, interrupts the first host system's root complex RC1 1812.

If the second host system 1820 accepts the socket initialization request, the endpoint EP2 1824 performs a PCIe DMA operation to the first host system's root complex RC1 1812 indicating the second half of the socket's parameters, i.e. the base, limit, and starting offset into the work queue 1860 to be used for the second host system's half of the socket.

Once the socket has been initialized in the manner described above, send/receive operations may be performed using the established socket in one of two ways: pull transactions or push transactions. With a pull transaction, the root complex RC1 1812 of the first host system 1810 performs send operations by writing a WQE to its work queue 1850 and then writing to a doorbell structure 1878 associated with the endpoint EP2 1824, which is accessible through root complex RC1 1812 PCIe bus memory address space. When the doorbell write operation completes, the second host system 1820 either polls or gets an interrupt and then polls to retrieve the doorbell structure 1878 through the second host system's real memory address space. The endpoint EP2 1824 then performs a PCIe DMA operation to the root complex RC1 1812 to retrieve the WQE associated with the send operation. The PCIe DMA operation uses the first host system's PCIe memory bus address space and places the results into memory 1880 on the second host system that is accessible through the second host system's real memory address space. The second host system 1820 then retrieves the data segment specified in the WQE and associated with the send operation.

When the second host system completes the work requested in the WQE, the endpoint EP2 1824 performs a PCIe DMA operation to the root complex RC1 1812 to push a CQE signaling that the send operation has completed. This DMA operation uses the first host system's PCIe memory bus address space and places the results into memory 1870 on the first host system 1810 that is accessible through the first host system's real memory address space.

For a push transaction, the root complex RC2 1822 writes into a doorbell structure 1888 for endpoint EP1 1814 indicating the number of receive WQEs it has available. When the endpoint EP1 1814 has data to send, the endpoint EP1 1814 checks to determine if the endpoint EP1 1814 has any receive WQEs available on the work queue 1860 of root complex RC2 1822. If there are no available receive WQES, the root complex RC1 1812 writes into the endpoint EP2's buffer full flag 1887 to indicate that the first host system 1810 has data to send on the socket and the second host system 1820 needs to post some buffers through receive WQEs for that socket.

If there are available receive WQEs, the second endpoint EP2 1824 performs a PCIe DMA operation to the root complex RC1 1812 to retrieve the next WQE available on the root complex RC1's work queue 1850. The DMA operation uses the first host system's PCIe memory bus address space and places the results into memory 1880 on the second host system 1820 that is accessible through the second host system's real memory address space. The second host system 1820 then sends its data to the data segments passed in the receive WQE.

When the second host system 1820 completes the work requested, the endpoint EP2 1824 then performs a PCIe DMA operation to the root complex RC1 1812 to push a CQE signaling that the send operation has completed. This DMA operation uses the first host system's PCIe memory bus address space and places the results into memory on the first host system 1810 that is accessible through the first host system's real memory address space.

FIG. 19 is a flowchart outlining an exemplary operation for performing a pull transaction using a socket based communication connection in accordance with one illustrative embodiment. The operation starts with a root complex of a first host system writing a WQE to its work queue (step 1910) and then writing to a doorbell structure associated with a target endpoint (step 1920). When the doorbell write operation completes, the second host system either polls or gets an interrupt and then polls to retrieve the doorbell through the second host system's real memory address space (step 1930).

The target endpoint then performs a PCIe DMA operation to the root complex of the first host system to retrieve the WQE associated with the send operation (step 1940). The target endpoint places the results of the PCIe DMA operation into memory on the second host system (step 1950). The second host system then retrieves the data segment specified in the WQE and associated with the send operation (step 1960).

In response to the second host system completing the work requested in the WQE (step 1970), the target endpoint performs a PCIe DMA operation to the root complex of the first host system to push a CQE signaling that the send operation has completed (step 1980). The root complex of the first host system places the results of the PCIe DMA operation into the memory of the first host system (step 1990). The operation then terminates.

Figure 20:
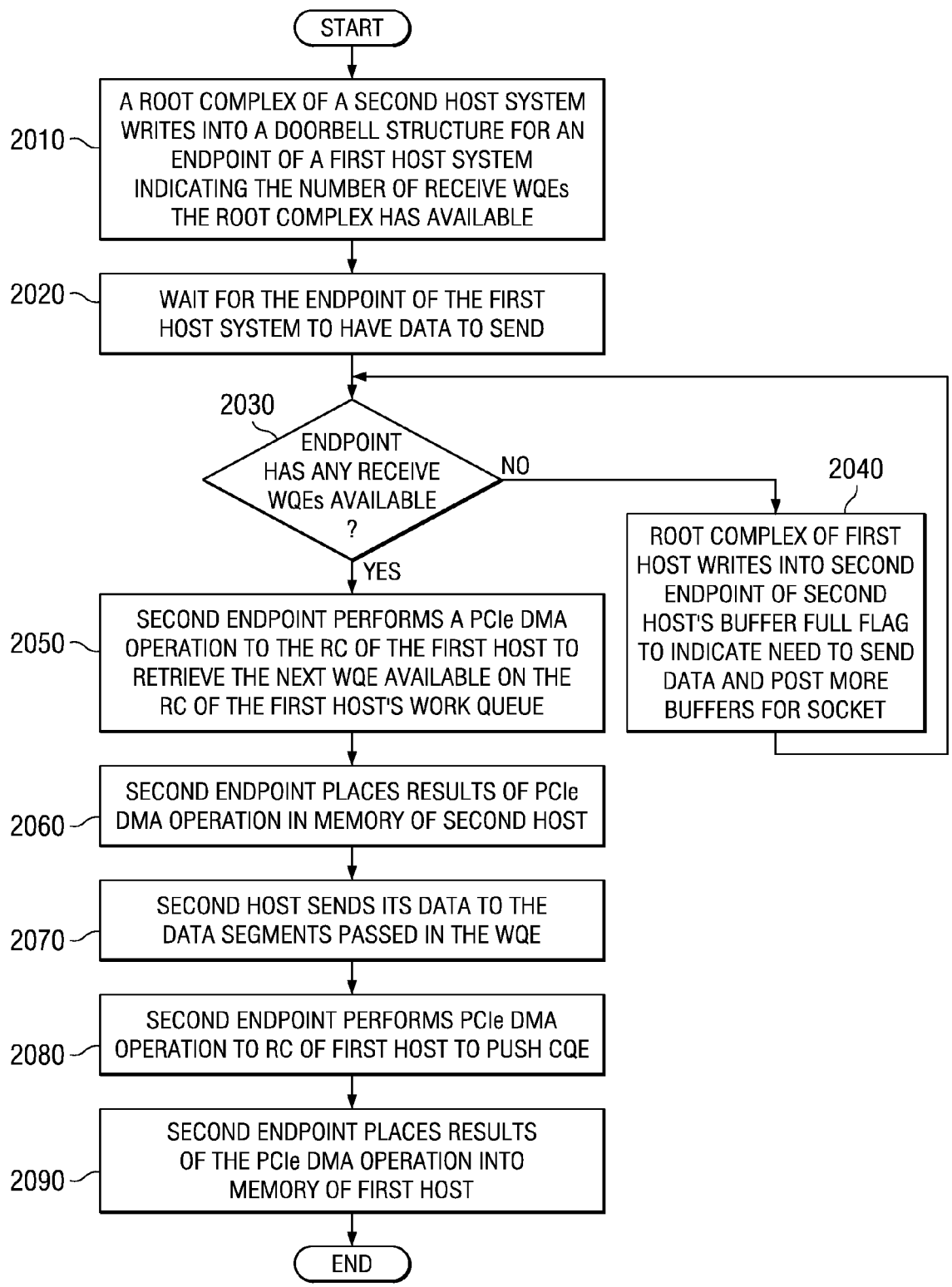
FIG. 20 is a flowchart outlining an exemplary operation for performing a push transaction using a socket based communication connection in accordance with one illustrative embodiment.

FIG. 20 is a flowchart outlining an exemplary operation for performing a push transaction using a socket based communication connection in accordance with one illustrative embodiment. A root complex of a second host system writes into a doorbell structure for an endpoint of a first host system, indicating the number of receive WQEs the root complex has available (step 2010). In response to the endpoint of the first host system having data to send (step 2020), the endpoint of the first host system checks to determine if the endpoint has any receive WQEs available on the work queue of root complex of the second host system (step 2030). If there are no available receive WQEs, the root complex of the first host system writes into a second endpoint of the second host system's buffer full flag to indicate that the first host system has data to send on the socket and the second host system needs to post some buffers through receive WQEs for that socket (step 2040). The operation then returns to step 2030).

If there are available receive WQEs, the second endpoint performs a PCIe DMA operation to the root complex of the first host system to retrieve the next WQE available on the root complex of the first host system's work queue (step 2050). The second endpoint places the results of the PCIe DMA operation into the memory of the second host system (step 2060). The second host system then sends its data to the data segments passed in the receive WQE (step 2070).

When the second host system completes the work requested, the second endpoint performs a PCIe DMA operation to the root complex of the first host system to push a CQE signaling that the send operation has completed (step 2080). The second endpoint places the results of the PCIe DMA operation into memory on the first host system (step 2090). The operation then terminates.

As discussed above, the mechanisms of the illustrative embodiments allow system images within a given root complex to use one or more of an endpoint's physical and virtual functions. With addition of such ability, the interaction of physical and virtual functions of the various endpoints may need to be considered when providing the system images with the ability to use such functions. For example, various combinations of functions may be required, permitted, or not permitted depending upon various criteria.

As an example, there are functions (physical and/or virtual) that may be required to work in conjunction with one another to achieve a desired operation. For example, cryptographic functions and Ethernet functions may be required to work together to provide encrypted traffic control. Moreover, there may also be combinations of functions which should not be supported because their additive functions do not generate increased functionality. Furthermore, there may be other limitations that prohibit all physical functions from have equal numbers of virtual functions.

The illustrative embodiments provide a mechanism by which multiple functions may be registered in combinations. The mechanism informs a management component, e.g. a SR-PCIM or MR-PCIM, of a multifunction endpoint's functional combinations. The management component may then use this information to select the functional combinations that are to be made visible to each system image. The informing of the management component may be performed by writing values to various predefined fields in the PCIe configuration space for a physical or virtual function that provides information regarding the number of virtual functions supported, the combination of functions supported, a nominal combination of virtual functions to be used by the physical function, and a group identifier for identifying which functions are linked in a combination grouping.

FIG. 21 is an exemplary table showing three new fields added to the PCIe configuration space in accordance with one illustrative embodiment. As shown in FIG. 21, three additional fields are added to the PCIe configuration space 2100. The first is the supported combination (combo) bitmap (SCB) field 2103. This field is generated by the designer of the endpoint hardware, and allows that designer to report to the software or firmware exactly which combinations of functions that the physical functions (PFs) and virtual functions (VFs) of the endpoint will support. In general, not all combinations may be allowed, and this field reports to the software or firmware which combinations may be used.

The SCB field 2103 is a read-only field to the software or firmware. The SCB field 2103 only appears in PF0 of the endpoint, and specifies the valid combinations for all VFs and PFs in that endpoint.

The nominal combo number (NCN) field 2101 is a field that is written with a value by firmware or software to specify which nominal combo, as reported by the SCB field 2103, is to be used for the specific PF or VF in which the specific extended configuration space is associated. The value that the software chooses to write into the NCN field is determined by the software based on which combinations of functions that the software wants to group together. This might be determined by software functionality, or by a user interface that allows a user to group functions together. The NCN field exists in each function's configuration space.

Once the NCN is determined by the firmware or software for a VF or PF, then if the NCN specifies more than one PF or VF in the combination, the firmware or software specifies which other VFs or PFs are associated with the VF or PF. This association may be specified, for example, by using a group number, called the combo instance number (CIN), which is stored in the CIN field 2102 in each function's configuration space. The CIN field 2102 is written by the firmware or software once the determination is made as to which functions are to be grouped together. Functions may have a group size of one function, in which case they have a value in the CIN field 2102 which is unique to just that function. Moreover, functions may have any other group size greater than one function, in which case the CIN value in the CIN field 2102 associated with the functions is shared amongst the functions of the group.

FIG. 22 is an exemplary table representing an interpretation of a supported combination bitmap (SCB) that defines the supported combination of functions of the endpoint in accordance with one illustrative embodiment. As shown in FIG. 22, the SCB 2206 is the last column of this interpretation table 2200. There exists a bit position 2207-2213 in the SCB 2206 for each possible combination of the functions 2202-2205 of the endpoint, regardless of whether the combination is supported or not. The least significant bit 2207 of the SCB 2206, or bit 0 as numbered from the least significant bit, represents a nominal combo number (NCN) 2201 of 0. The next bit 2208 of the SCB 2206, i.e. bit 1, represents an NCN 2201 of 1, which is function F0 2205 by itself (i.e., not grouped with any other function) as indicated by the value of 1 in the column for F0 2205 and the values in the remaining columns 2202-2204 in the row for NCN 1 being a value of 0.

Bit 2 2209 of the SCB 2206 represents an NCN 2201 of 2, which is F0 2205 and F1 2204 grouped together, as indicated by a value of 1 in both of those columns, and so forth. The value of each bit 2207-2213 in the SCB 2206 represents whether the combination is valid, with a value of 0 representing that it is not, and a value of 1 representing that it is. Thus, each bit in the SCB 2206 is associated with a unique NCN number 2201, which corresponds to the bit number of the SCB 2206.

Figures 23, 24:
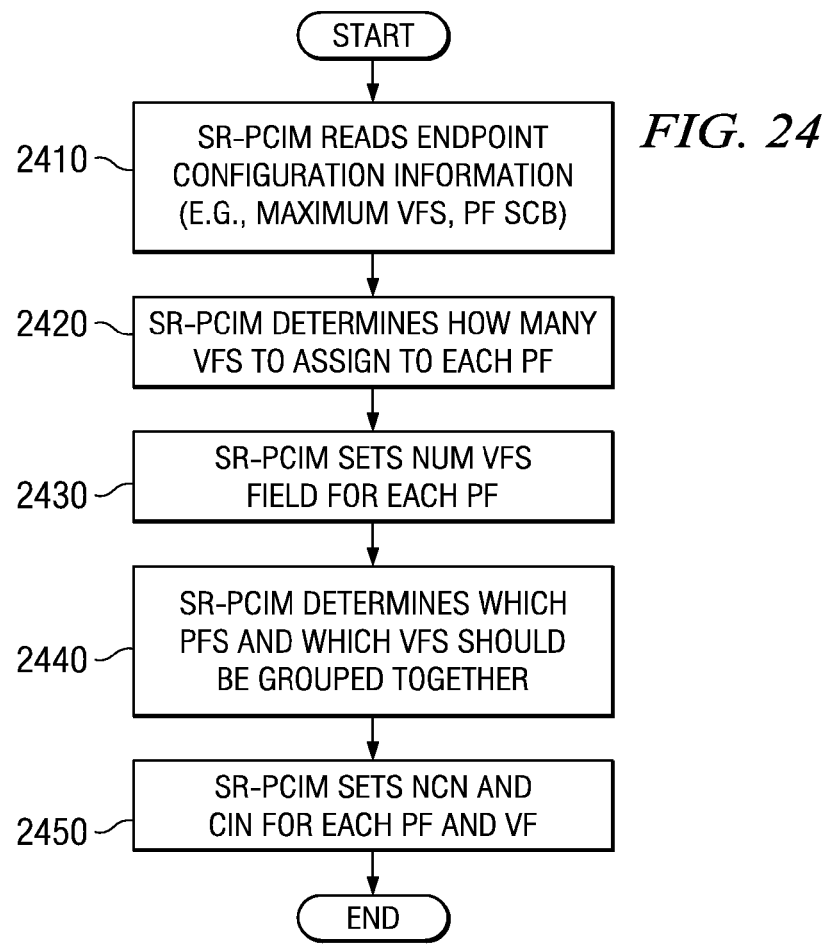
FIG. 23 is an exemplary table representing a specific example of a SCB in accordance with one illustrative embodiment.
FIG. 24 is a flowchart outlining an exemplary operation for endpoint configuration in accordance with one illustrative embodiment.

FIG. 23 is an exemplary table representing a specific example of a SCB in accordance with one illustrative embodiment. As shown in FIG. 23, this endpoint has three functions 2302-2304, giving eight possible combinations and therefore, eight bits in the SCB 2305, each representing one NCN 2301. The SCB 2305 in this case is binary "00011110" (i.e., bits 1, 2, 3, and 4 are a value of 1) indicating that NCNs of 1, 2, 3, and 4 are valid (i.e., SCB bits 2306 representing those NCNs are a value of one).

FIG. 24 is a flowchart outlining an exemplary operation for configuring an endpoint in accordance with one illustrative embodiment. As shown in FIG. 24, the operation starts with the configuration manager, which, for example, in this case is a single root PCI manager (SR-PCIM), reading the endpoint's PCI configuration space, and specifically, the maximum number of VFs (Max VFs field) and the SCB from PF0 (step 2410). The SR-PCIM determines how many VFs to assign to each PF (step 2420). This may be done with user input as to how the user wants the system to be configured. For example, the software may display the Max VFs field to the user and the user may supply an input into the software indicating how many VFs they actually want to use. Given this input, the SR-PCIM sets the Num VFs field in the PCI configuration space for each PF (step 2430).

The SR-PCIM determines how to group PFs and VFs (step 2440). This is done with user input as to how the user wants the system to be configured. For example, the software may display the SCB fields to the user and the user may input into the software which NCNs that they want to use and which VFs and PFs are to be grouped together. Given this input, the SR-PCIM sets the NCN and CIN for each PF and VF (step 2450), and the operation terminates.

Figure 25:
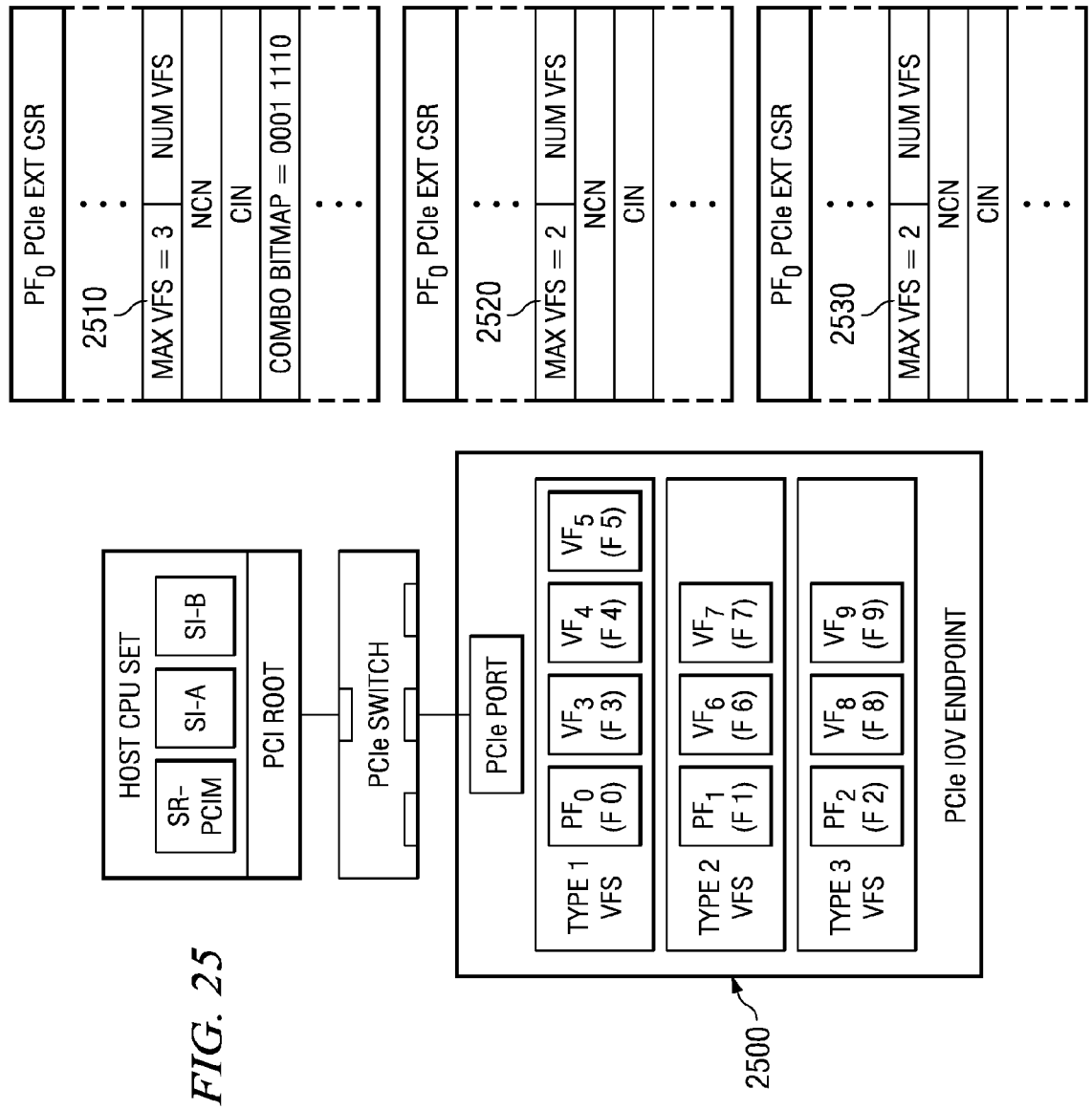
FIG. 25 is an exemplary diagram illustrating an exemplary determination of a maximum number of virtual functions (VFs) that each physical function (PF) may implement in accordance with one illustrative embodiment.

FIG. 25 illustrates a determination of a maximum number of virtual functions (VFs) that each physical function (PF) may implement in accordance with one illustrative embodiment. As shown in FIG. 25, endpoint 2500 includes three PFs. PF0 reports that it can support three VFs 2510. Likewise, PF1 reports it can support two 2520 and PF2 reports that it can support two 2530. These values can be reported to the user that is configuring the system to determine how many VFs will actually be assigned, as shown in FIG. 26.

Figure 26:
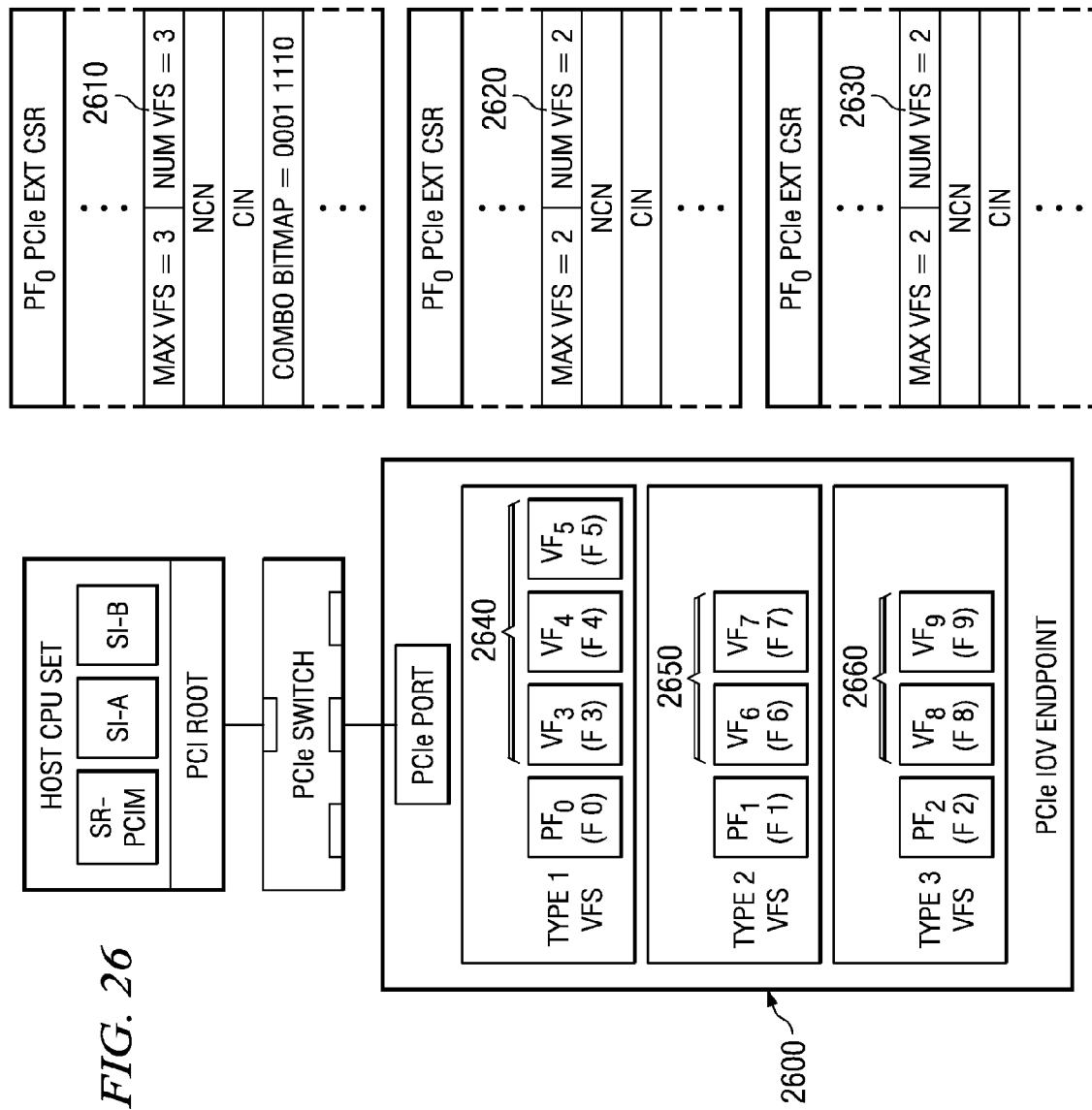
FIG. 26 is an exemplary diagram illustrating an exemplary setting of a number of VFs per PF in accordance with one illustrative embodiment.

FIG. 26 illustrates setting of the number of VFs per PF in accordance with one illustrative embodiment. As shown in FIG. 26, the determination has been made, given the results from FIG. 25, that the maximum VFs will be used in all cases, and therefore PF0 gets assigned three VFs by the software or firmware writing the Num VFs field 2610 with a value of three. This then expands the functions associated with PF0 to three additional VFs 2640. Likewise, the Num VFs field 2620 for PF1 is set for two VFs, expanding PF1's associated functions 2650, and the Num VFs field 2630 for PF2 is set to two VFs, expanding PF2's associated functions 2660.

Figure 27:
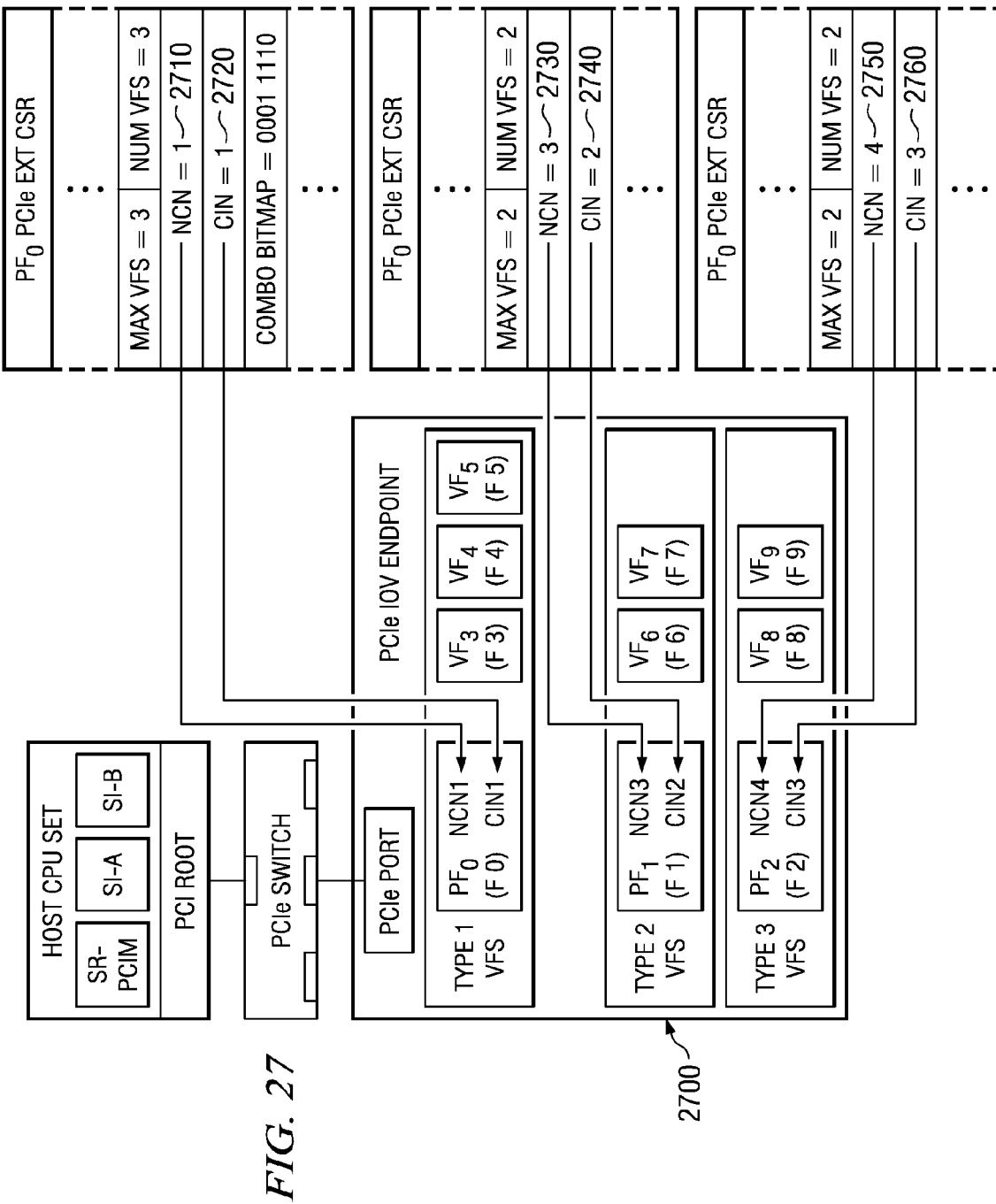
FIG. 27 is an exemplary diagram illustrating an exemplary setting of a nominal combo number (NCN) and combo instance number (CIN) for each PF in accordance with one illustrative embodiment.

FIG. 27 illustrates an example of setting the nominal combo number (NCN) and combo instance number (CIN) for each PF in accordance with one illustrative embodiment. As shown in FIG. 27, the determination has been made as to the combinations that will be allowed (e.g., as in 2440) in the endpoint 2700, and the process of setting the NCN and CIN fields for the PFs begins (e.g., as in 2450). For PF0, the NCN field 2710 is set to a value of 1 and the CIN field 2720 is set to a value of 1. Setting the NCN field to a value of 1 indicates that it is a function that will not be grouped with any other.

For FF1, the NCN field 2730 is set to a value of 3 and the CIN field 2740 to a value of 2. Setting the NCN field to a value of 3 indicates that it is a function that will be grouped with a VF associated with PF0 (see the NCNs in FIGS. 22 and 23, for example). When setting up the NCN fields and CIN fields for the VFs associated with PF0, one will have to have its NCN field set to a value of 3 and its CIN field set to a value of 2, in order to group that function with PF1 which has these same values for these fields. For PF2, the NCN field 2750 is set to a value of 4 and the CIN field 2760 is set to a value of 3. Setting the NCN field 2750 to a value of 4 indicates that it is a function that will not be grouped with any other function.

Figure 28:
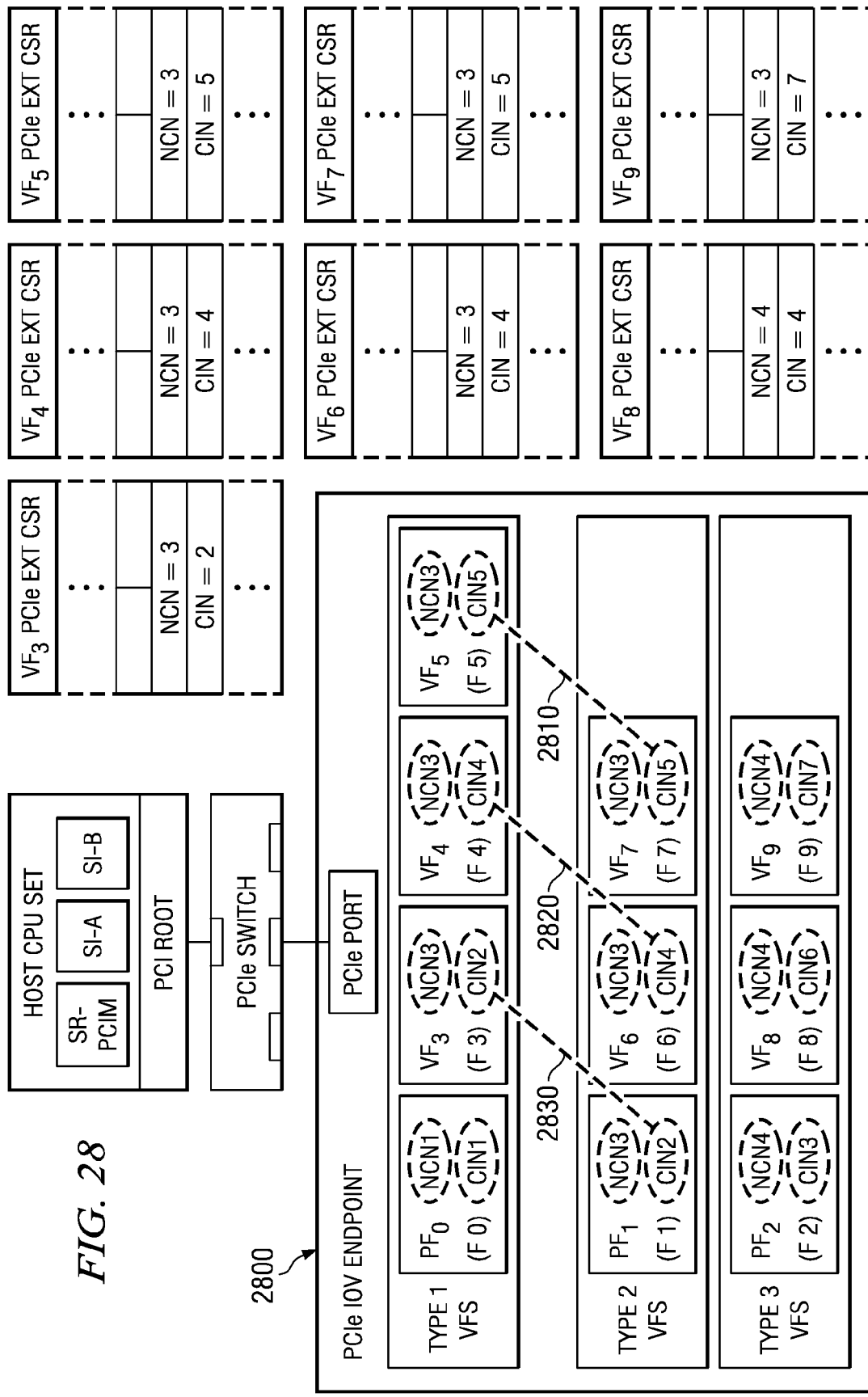
FIG. 28 is an exemplary diagram illustrating an exemplary setting of the NCN and CIN for each VF in accordance with one illustrative embodiment.

FIG. 28 illustrates an example of setting the NCN and CIN for each VF in accordance with one illustrative embodiment.

As shown in FIG. 28, after setting the NCN and CIN fields as shown, VF3 and PF1 are logically grouped together by their NCN and CIN fields being set the same, as shown by the dotted line 2830. Likewise, VF4 and VF6 are linked together 2820 and VF5 and VF7 are linked together 2810. In this way, PFs and VFs may be grouped together in combinations of functions.

Once the assignment of NCN and CIN are complete, the endpoint knows which functions are linked together. For example, an Ethernet function knows which (if any) encryption function is linked to it. Furthermore, SR-PCIM will treat those functions as one entity for purposes of such operations as Hot Plug removal, and reassignment of those functions to other SIs.

Thus, the mechanisms of the illustrative embodiments provide various functionalities for sharing endpoints across multiple system images and root complexes. These functionalities include the configuring of shared memory spaces for use in communicating between root complexes and endpoints, providing combinations of functions, and the like. These various mechanisms all add to a system's ability to expand as requirements change over time. Moreover, these various mechanisms enhance workload balancing, concurrent maintenance, and plethora of other desired system capabilities.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for configuring an endpoint for use with a host system, comprising:
   extracting a configuration space combination bitmap from an endpoint configuration space;
   generating one or more functions associated with the endpoint;
   associating at least one function with at least one other function in accordance with the configuration space combination bitmap to thereby generate a combination of functions; and
   utilizing the combination of functions to handle input/output requests provided to the endpoint; and
   extracting a maximum number of virtual functions from the endpoint configuration space, wherein:
   generating one or more functions associated with the endpoint comprises generating one or more virtual functions associated with one or more physical functions in the endpoint based on the maximum number of virtual functions,
   associating at least one function with at least one other function comprises associating at least one of the one or more virtual functions or the one or more physical functions with at least one of another virtual function or another physical function,
   each bit in the configuration space combination bitmap specifies a different combination of at least one of physical functions or virtual functions,
   setting individual ones of the bits in the configuration space combination bitmap specifies which combinations of at least one of physical functions or virtual functions are valid combinations of functions in the endpoint,
   each bit in the configuration space combination bitmap is associated with a unique combination number corresponding to a bit number of the bit in the configuration space combination bitmap, and
   the combination number is specified in configuration spaces of physical functions of the endpoint.

2. The method of claim 1, further comprising:
   displaying a maximum number of virtual functions for the one or more physical functions based on the identified maximum number of virtual functions in the endpoint configuration space; and
   receiving user input specifying a configuration of the endpoint desired by a user based on the displayed maximum number of virtual functions.

3. The method of claim 2, further comprising:
   determining a number of virtual functions to assign to each physical function in the one or more physical functions provided in the endpoint based on the user input; and
   setting a number of virtual functions field value in configuration spaces of the one or more physical functions based on the determined number of virtual functions to assign to each physical function.

4. The method of claim 1, wherein the configuration space combination bitmap has a bit for each possible combination of at least one of physical functions or virtual functions provided in the endpoint.

5. The method of claim 1, further comprising:
   generating a combination instance number for each valid combination of at least one of physical functions or virtual functions in the endpoint; and
   writing a corresponding combination instance number to configuration spaces associated with each physical function and virtual function in the endpoint, wherein associating at least one of the one or more virtual functions or the one or more physical functions with at least one of another virtual function or another physical function in accordance with the configuration space combination bitmap comprises associating the physical functions or virtual functions based on combination instance numbers associated with the physical functions or virtual functions.

6. The method of claim 1, further comprising:
   displaying fields corresponding to the configuration space combination bitmap;
   receiving user input specifying a selection of one or more unique combination numbers to have implemented in the endpoint; and
   writing the one or more unique combination numbers to configuration spaces of at least one of physical functions or virtual functions of the endpoint.

7. A computer program product comprising a computer useable medium having a computer readable program, wherein the computer readable program, when executed in a data processing system, causes the data processing system to:

extract a configuration space combination bitmap from an endpoint configuration space;

generate one or more functions associated with the endpoint;

associate at least one function with at least one other function in accordance with the configuration space combination bitmap to thereby generate a combination of functions; and utilize the combination of functions to handle input/output requests provided to the endpoint, wherein the computer readable program further causes the data processing system to extract a maximum number of virtual functions from the endpoint configuration space, and wherein:

generating one or more functions associated with the endpoint comprises generating one or more virtual functions associated with one or more physical functions in the endpoint based on the maximum number of virtual functions, and associating at least one function with at least one other function comprises associating at least one of the one or more virtual functions or the one or more physical functions with at least one of another virtual function or another physical function, each bit in the configuration space combination bitmap specifies a different combination of at least one of physical functions or virtual functions, setting individual ones of the bits in the configuration space combination bitmap specifies which combinations of at least one of physical functions or virtual functions are valid combinations of functions in the endpoint, each bit in the configuration space combination bitmap is associated with a unique combination number corresponding to a bit number of the bit in the configuration space combination bitmap, and the combination number is specified in configuration spaces of physical functions of the endpoint.

8. The computer program product of claim 7, wherein the computer readable program further causes the data processing system to:

display the maximum number of virtual functions for the one or more physical function based on the identified maximum number of virtual functions in the endpoint configuration space; and receive user input specifying a configuration of the endpoint desired by a user based on the displayed maximum number of virtual functions.

9. The computer program product of claim 8, wherein the computer readable program further causes the data processing system to:

determine a number of virtual functions to assign to each physical function in the one or more physical functions provided in the endpoint based on the user input; and set a number of virtual functions field value in configuration spaces of the one or more physical functions based on the determined number of virtual functions to assign to each physical function.

10. The computer program product of claim 7, wherein the computer readable program further causes the data processing system to:

generate a combination instance number for each valid combination of at least one of physical functions or virtual functions in the endpoint; and write a corresponding combination instance number to configuration spaces associated with each physical function and virtual function in the endpoint, wherein associating at least one of the one or more virtual functions or the one or more physical functions with at least one of another virtual function or another physical function in accordance with the configuration space combination bitmap comprises associating the physical functions or virtual functions based on combination instance numbers associated with the physical functions or virtual functions.

11. The computer program product of claim 7, wherein the computer readable program further causes the data processing system to:

display fields corresponding to the configuration space combination bitmap;

receive user input specifying a selection of one or more unique combination numbers to have implemented in the endpoint; and write the one or more unique combination numbers to configuration spaces of at least one of physical functions or virtual functions of the endpoint.

12. A data processing system, comprising:

a host system; and an endpoint coupled to the host system, wherein the host system:

extracts a configuration space combination bitmap from an endpoint configuration space;

generates one or more functions associated with the endpoint;

associates at least one function with at least one other function in accordance with the configuration space combination bitmap to thereby generate a combination of functions;

utilizes the combination of functions to handle input/output requests provided to the endpoint, and extracts a maximum number of virtual functions from the endpoint configuration space, and wherein:

the host system generates one or more functions associated with the endpoint by generating one or more virtual functions associated with one or more physical functions in the endpoint based on the maximum number of virtual functions, the host system associates at least one function with at least one other function by associating at least one of the one or more virtual functions or the one or more physical functions with at least one of another virtual function or another physical function, each bit in the configuration space combination bitmap specifies a different combination of at least one of physical functions or virtual functions, setting individual ones of the bits in the configuration space combination bitmap specifies which combinations of at least one of physical functions or virtual functions are valid combinations of functions in the endpoint, each bit in the configuration space combination bitmap is associated with a unique combination number corresponding to a bit number of the bit in the configuration space combination bitmap, and the combination number is specified in configuration spaces of physical functions of the endpoint.

* * * * *